United States Patent
Chien et al.

(10) Patent No.: US 8,065,203 B1
(45) Date of Patent: Nov. 22, 2011

(54) COMPUTER-IMPLEMENTED SYSTEMS AND METHODS FOR PRODUCT ATTRIBUTE ESTIMATIONS

(75) Inventors: Yung-Hsin Chien, Apex, NC (US); Mahesh V. Joshi, Cary, NC (US); Ann Mary McGuirk, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 461 days.

(21) Appl. No.: 12/004,554

(22) Filed: Dec. 21, 2007

Related U.S. Application Data

(60) Provisional application No. 60/953,231, filed on Aug. 1, 2007.

(51) Int. Cl.
*G06Q 10/00* (2006.01)
(52) U.S. Cl. ........... 705/28; 705/22; 705/7.25; 705/7.31
(58) Field of Classification Search .................. None
See application file for complete search history.

(56) References Cited

U.S. PATENT DOCUMENTS

| | | | |
|---|---|---|---|
| 6,910,017 B1 | 6/2005 | Woo et al. | |
| 6,988,104 B2* | 1/2006 | Kootale | 1/1 |
| 7,092,929 B1* | 8/2006 | Dvorak et al. | 705/28 |
| 7,171,376 B2 | 1/2007 | Ramakrishnan | |
| 2003/0050808 A1* | 3/2003 | Mor | 705/7 |
| 2004/0098296 A1* | 5/2004 | Bamberg et al. | 705/10 |
| 2005/0197881 A1* | 9/2005 | Fotteler et al. | 705/9 |
| 2005/0240469 A1 | 10/2005 | Rose et al. | |
| 2006/0143030 A1 | 6/2006 | Wertheimer | |
| 2007/0050235 A1* | 3/2007 | Ouimet | 705/10 |

* cited by examiner

*Primary Examiner* — Luna Champagne
(74) *Attorney, Agent, or Firm* — Jones Day

(57) ABSTRACT

Systems and methods for providing estimations for a product for purchase at a plurality of stores. Groups of stores are generated based upon similarity of store demand data. For each group, a distribution is determined with respect to the attribute of the product. The distribution is used to provide estimations with respect to the product to be provided at the stores.

17 Claims, 49 Drawing Sheets

| Style-Color | Size | Store | Pd.1 | Pd.2 | Pd.3 | Pd.4 | Pd.5 | Pd.6 | Pd.7 | Pd.8 | Pd.9 | Pd.10 | Pd.11 | Pd.12 | Pd.13 |
|---|---|---|---|---|---|---|---|---|---|---|---|---|---|---|---|
| 1 | S | 1 | 10 | 15 | 11 | 12 | 9 | 8 | 7 | 5 | 4 | 2 | 1 | 1 | 1 |
| 1 | M | 1 | 70 | 105 | 77 | 84 | 63 | 56 | 49 | 35 | 28 | 14 | 7 | 7 | 7 |
| 1 | L | 1 | 20 | 30 | 22 | 24 | 18 | 16 | 14 | 10 | 8 | 4 | 2 | 2 | 2 |
| ⋯ | ⋯ | ⋯ | | | | | | | | | | | | | |
| 1 | S | 10 | 30 | 45 | 33 | 36 | 27 | 24 | 21 | 15 | 12 | 6 | 3 | 3 | 3 |
| 1 | M | 10 | 60 | 90 | 66 | 72 | 54 | 48 | 42 | 30 | 24 | 12 | 6 | 6 | 6 |
| 1 | L | 10 | 10 | 15 | 11 | 12 | 9 | 8 | 7 | 5 | 4 | 2 | 1 | 1 | 1 |

Fig. 11

| Style-Color | Size | Store | Pd.1 | Pd.2 | Pd.3 | Pd.4 | Pd.5 | Pd.6 | Pd.7 | Pd.8 | Pd.9 | Pd.10 | Pd.11 | Pd.12 | Pd.13 | Total |
|---|---|---|---|---|---|---|---|---|---|---|---|---|---|---|---|---|
| 1 | S | 1 | 20 | 30 | 22 | 24 | 18 | 16 | 14 | 10 | 8 | 4 | 2 | 2 | 2 | 172 |
| 1 | M | 1 | 60 | 90 | 66 | 72 | 54 | 48 | 42 | 30 | 24 | 12 | 6 | 6 | 6 | 516 |
| 1 | L | 1 | 20 | 30 | 22 | 24 | 18 | 16 | 14 | 10 | 8 | 4 | 2 | 2 | 2 | 172 |
| 1 | S | 2 | 20 | 30 | 22 | 24 | 18 | 16 | 14 | 10 | 8 | 4 | 2 | 2 | 2 | 172 |
| 1 | M | 2 | 60 | 90 | 66 | 72 | 54 | 48 | 42 | 30 | 24 | 12 | 6 | 6 | 6 | 516 |
| 1 | L | 2 | 20 | 30 | 22 | 24 | 18 | 16 | 14 | 10 | 8 | 4 | 2 | 2 | 2 | 172 |
| 1 | S | 10 | 30 | 45 | 33 | 36 | 27 | 24 | 21 | 15 | 12 | 6 | 3 | 3 | 3 | 258 |
| 1 | M | 10 | 60 | 90 | 66 | 72 | 54 | 48 | 42 | 30 | 24 | 12 | 6 | 6 | 6 | 516 |
| 1 | L | 10 | 10 | 15 | 11 | 12 | 9 | 8 | 7 | 5 | 4 | 2 | 1 | 1 | 1 | 86 |

*Fig. 17*

Tabs: Style-Color 1, All Stores / Style-Color 2, All Stores / Style-Color 16, All Stores

950

| | 01047-GIRLS  07/23/2006 | | Status: Data loaded  End Date: 08/03/2006 | |
|---|---|---|---|---| participation to include: ☐   Minimum number of participated stores: ☐
participation to exclude: ☐   Minimum number of weeks without sales at store: ☐

| (%) | Number of Outlier Sizes | Sales Units | Store Groups | Status |
|---|---|---|---|---|
| | | | 5 | Groups created |
| | | | 20 | |
| | | | 10 | |
| | | | | |

↑ 1560

MATCH TO FIG. 26A

| Medium-Store Participation Rate (%) | | Large-Store Participation Rate (%) | |
|---|---|---|---|
| ☑ | 50 | ☑ | 50 |
| ☑ | 25 | ☑ | 2 |
| ☑ | 40 | ☑ | 85 | data removed (%): 2.5          Number of products removed: 50

MATCH TO FIG. 28B

| Project | Project Description | Project Due | Project Scope |
|---|---|---|---|
| GIRLS Fall | Girls knit tops for Fall | 08/31/2006 | 01047-GIRLS |
| Shoes Fashion | shoes for fashion conscious | 09/30/2006 | 01131-WOMENS |
| Shoes Junior | shoes for children | 09/30/2006 | 01047-GIRLS |
| Shoes Traditional | shoes for casual or dress | 09/30/2006 | 01131-WOMENS |
| Shoes Updated | new shoes lines | 10/01/2006 | (null) |

Revenue Optimization
File Edit View Tools Window Help
Profile Project List
List Details
Project Count: 6 — 1710
Profile Project List

Create Plan

- Set general details
- Select size set
- Set configurations
- Set notes

Name: System generated name auto fills/user can overwrite
Description:

Product-locations in plan
Products: 8,360
Locations: All                    View Product-locations Data date ranges
Start date: 08/06/2005
End date: 08/06/2005

Project due date
Due date: 08/06/2005

< Back    Next >    OK    Cancel    Help
         └─1810      └─1800

*Fig. 30*

Create Plan

- Set general details
- Select size set
- Set configurations
- Set notes

Select a row to choose a Size Set:

| Size Set | Number of Sizes | Number of Products |
|---|---|---|
| Small, Medium, Large, X-Large | 4 | |
| Medium, Large | 2 | |

Details of selected Size Set:

| Name | Code |
|---|---|
| Small | |
| Medium | |
| Large | |
| X-Large | |

[ < Back ]  [ Next > ]  [ OK ]  [ Cancel ]  [ Help ]

1850 — Cancel/Help group
1860 — Next >

*Fig. 31*

COMPUTER-IMPLEMENTED SYSTEMS AND METHODS FOR PRODUCT ATTRIBUTE ESTIMATIONS

CROSS-REFERENCE TO RELATED APPLICATION

This application claims priority to and the benefit of U.S. Application Ser. No. 60/953,231 (entitled "Computer-Implemented Systems and Methods For Product Attribute Estimations" and filed on Aug. 1, 2007), of which the entire disclosure (including any and all figures) is incorporated herein by reference.

TECHNICAL FIELD

This document relates generally to computer-implemented product analysis systems, and more particularly to computer-implemented systems for providing estimations for product attributes.

BACKGROUND

Retailers confront many issues when deciding what products to carry. The issues can become even more daunting when the decision process additionally has to consider which types of a specific product a retailer should carry. For example, shoe products come in many different sizes. Determining what sizes in addition to what specific shoes to carry becomes problematic especially given the vast array of shoe options available to a retailer.

Retailers typically solve the problem of how much and what sizes of a product to carry among their various stores by looking at the product allocation decisions of the previous year, and then, they will make slight adjustments based on relatively simple analytics and/or intuition given the previous year's sales and performance. Retailers may also try to address this problem by analyzing revenue goals that have been set at a company level. They then decide how to best reach these goals—that is, they typically determine, among other things, how much of each product they should order (and sell) to meet these goals. Such approaches can lead to product assortments that are not aligned with consumer demands for the retailers.

SUMMARY

In accordance with the teachings provided herein, systems and methods for operation upon data processing devices are configured to provide estimations for a product for purchase at a plurality of stores. Groups of stores are generated based upon similarity of store demand data. For each group, a distribution of attribute values is determined with respect to the attribute of the product. The distribution is used to provide estimations with respect to the amount of product to be provided for sale at the stores.

As another example, a system and method can be configured to provide estimations for a product containing an attribute with multiple values. Groups of stores are generated based upon similarity of store demand data, wherein each store is uniquely assigned to a group based upon similarity of the store to other stores in a group. For each group, a distribution of attribute values is determined with respect to the attribute of the product. A product scope hierarchy having nodes is processed in order to assign a distribution with respect to the attribute of the product at each node within the product scope hierarchy for each group of stores. The assigned distribution is used to provide estimations with respect to the amount of product to be provided for sale at the stores. The estimations also take into account the product having multiple values for the attribute of the product.

As yet another example, a system and method can be configured to provide estimations as follows. Before using historical data (e.g., point-of-sale (POS) data) to estimate product size distributions, the system and method adjust for periods where demand was constrained by inventory (e.g., out-of-stock, not having enough stock to meet the demand, combinations thereof, etc.). Store groups are formed based on similarity in size distributions of product sales using the adjusted POS data, thereby reducing problems due to sparse data and inherently noisy data. Store classifiers are identified allowing the system and method to classify new stores or stores with insufficient or low volume of sales data to the store groups previously identified in order to estimate their product size distributions. Cross-validation can be used to determine at what level in the product hierarchy the most reliable size distributions are estimated.

BRIEF DESCRIPTION OF THE DRAWINGS

FIGS. 8A-14B are displays related to creating a data project and processing the data associated with the data project.

FIG. 17 shows a graphical user interface of style-color information being aggregated across time.

FIGS. 28A-35B depict another example for the creation and handling of a new data project.

DETAILED DESCRIPTION

Figure 1:
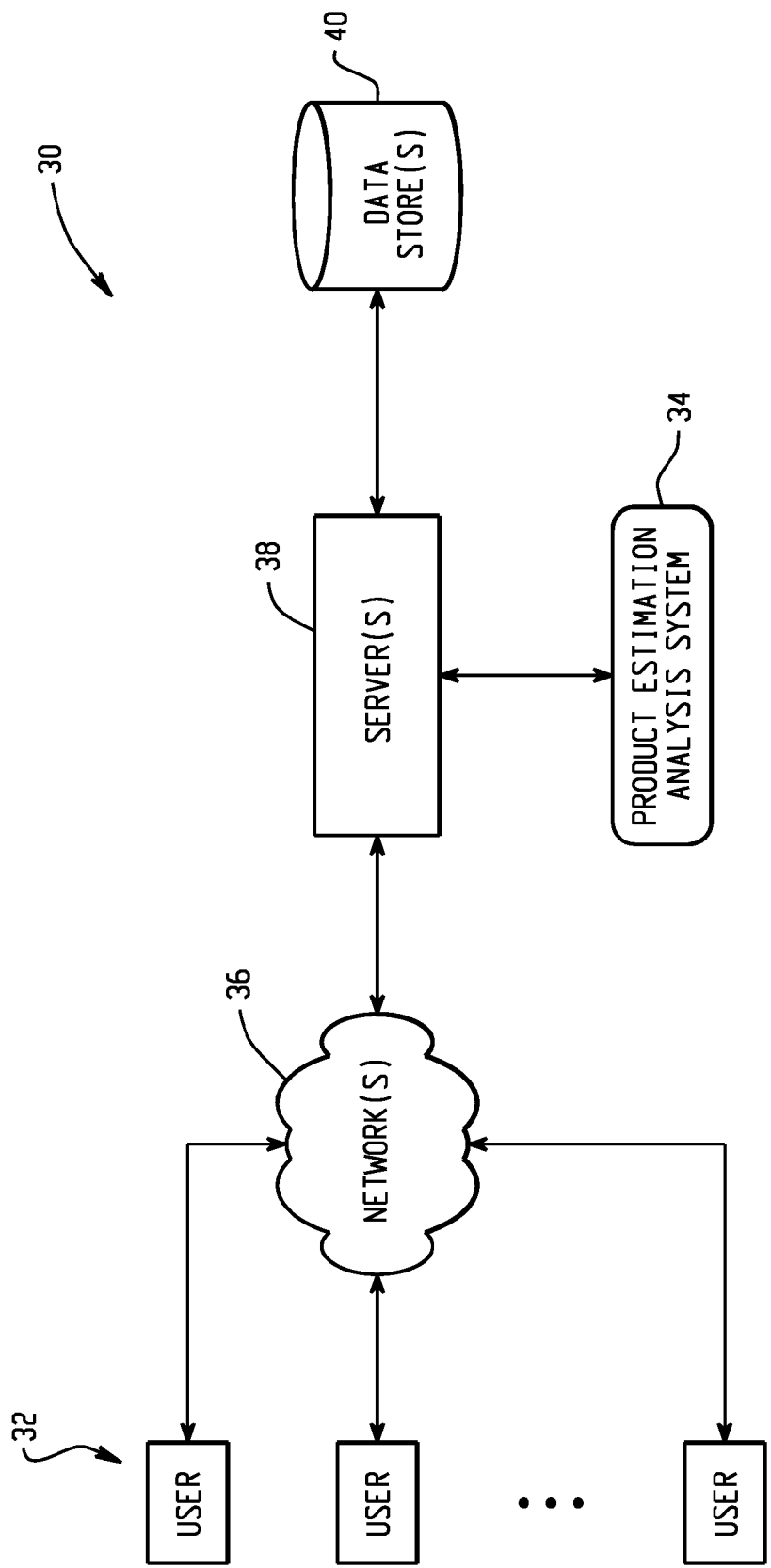
FIG. 1 is a block diagram depicting an environment wherein users can interact with a product estimation analysis system.

FIG. 1 depicts at 30 an environment wherein users 32 can interact with a product estimation analysis system 34 that provides estimations for a product for purchase at a plurality of stores. As an illustration, the product estimation analysis system 34 can determine the proportion of sizes of an apparel product (e.g., clothes, shoes, etc.) a retailer should carry. This can be used for, among other things, to determine how to allocate allotted products among a company's retail stores—that is, which stores should receive the products, and how many units of each different type of product (e.g., which product sizes, colors, etc.) should be shipped to these stores.

The users 32 can interact with the product estimation analysis system 34 through a number of ways, such over one or more networks 36. Server(s) 38 accessible through the network(s) 36 can host the product estimation analysis system 34. One or more data stores 40 (e.g., databases) can store the data to be analyzed by the system 34 as well as any intermediate or final data generated by the system 34.

The product estimation analysis system 34 can be an integrated web-based analysis tool that provides users flexibility and functionality for performing product size estimations. It should be understood that the product estimation analysis system 34 could also be provided on a stand-alone computer for access by a user.

Figure 2:
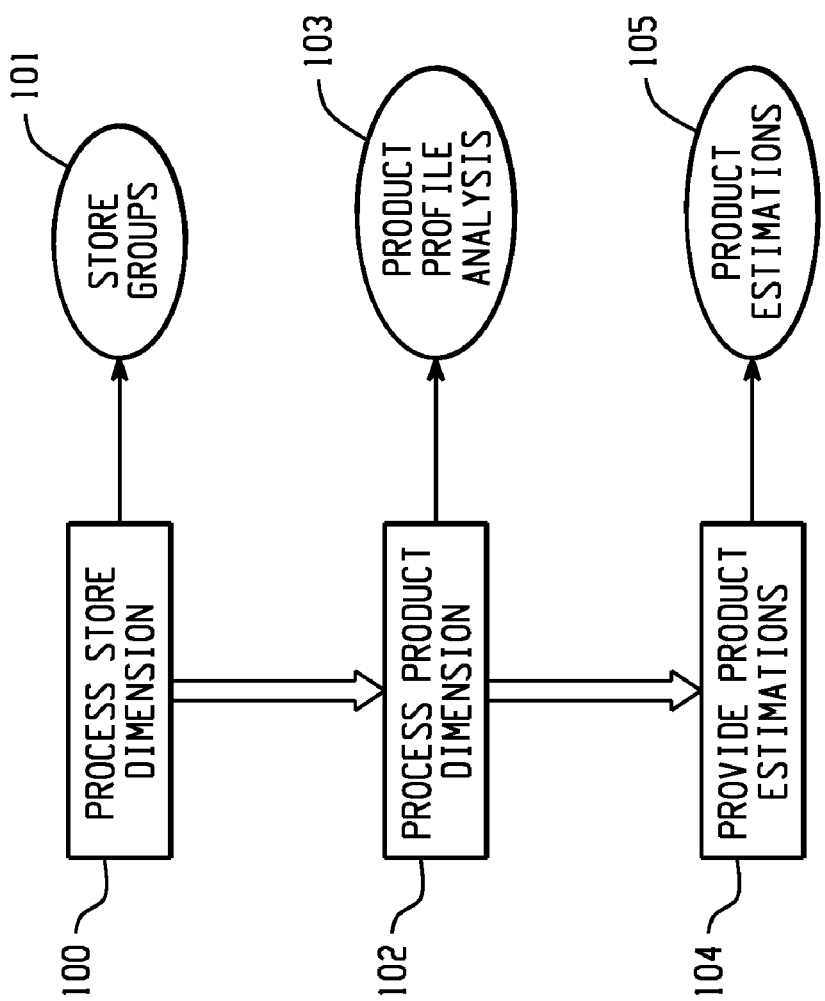
FIGS. 2 and 3 are block diagrams depicting systems for providing estimations for a product.

FIG. 2 depicts processing that a product estimation analysis system can perform in order to provide estimations for a product. In this example, processing occurs across multiple dimensions. As shown at 100, the store dimension (e.g., the facet of the analysis that focuses on store-specific data) is processed in order to generate groups of stores 101. Store groups are generated based upon stores having similar characteristics to each other. As shown at 102, the product dimension (e.g., the facet of the analysis that focuses on product-specific data) is processed in order to generate product profile analysis output 103. Based upon the groups of stores and the product profile analysis output 103, estimations 105 for a product are generated as shown at 104.

Figure 3:
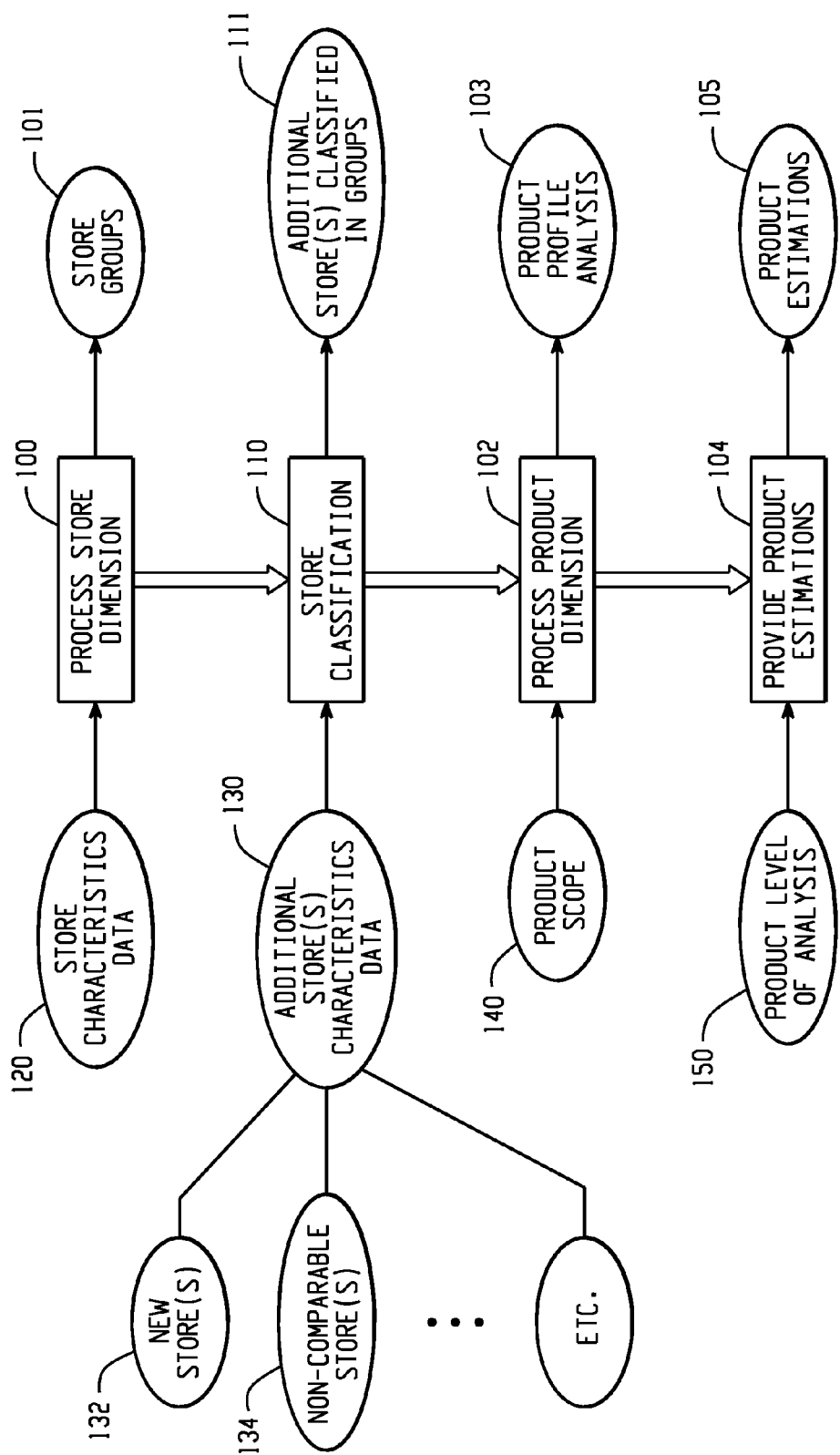

It should be understood that similar to the other processing flows described herein, the steps and the order of the steps in the processing flow may be altered, modified, removed and/or augmented and still achieve the desired outcome. An illustration of this is provided in FIG. 3 wherein additional processing has been added. With reference to FIG. 3, process 100 uses store characteristics data 120 to generate groups 101 of stores. Store classification process 110 can be inserted into the processing flow in order to assign additional stores to the groups created during process 100. The store classification process 110 compares store characteristics data of the additional stores against the characteristics that were evaluated in process 100. The store classification process 110 attempts to classify such additional stores as: new stores 132 (e.g., stores that opened or are to open after the time when the initial store groups were created), non-comparable stores 134 (e.g., stores with insufficient historical data), and other types of stores (e.g., stores with noisy or low volume sales data).

For processing the product dimension via process 102, input 140 contains information about the various products to be analyzed. Based upon input 140, the scope of the products are examined in order to generate an analysis 103 of the product profiles. The output generated by process blocks 100, 110, and 102 are then used as input 150 to process 104 for providing estimations with respect to amount of product to be provided for sale at the stores.

As another example, processing can be further augmented by utilizing available point of sales (POS) data as well as inventory and store characteristics to estimate store level product size distributions. First, product and geography scopes are specified. Once the scope is determined, POS data can be used to determine the number of different size-sets found among these products. For example there may be two size-sets in a given product scope ({S, M, L} and {S, M, L, XL}). Once a set of products with a given size-set is determined, the system in this example proceeds as follows. In order to use POS data to estimate product size distributions, the sales data is adjusted during those periods in which demand was constrained by the availability of inventory. During these periods, observed sales may not accurately reflect demand. To impute sales during these demand constrained periods, information is borrowed from stores with similar sales patterns. Stores with similar sales patterns are identified by using clustering methods based on store level sales.

Once completed, a series of sales data is obtained at one or more aggregation levels, such as at the store level, SKU level, week level, etc. Typically, weekly sales at the store and SKU levels are sparse and the data tends to be noisy. In order to reduce the noise in the data, the store dimension is processed in order to reduce the geography dimension in the analysis—that is, similar stores are grouped together based on the overall size distribution. In order to obtain these groupings the system proceeds as follows. First, the weekly store and SKU sales data are aggregated across time and then across all SKUs within the same size-set in a given scope, thereby resulting in one size distribution of sales for each store. Clustering is then performed again, but this time stores are clustered based on the similarity of their sales size distribution. For clustering, mixture modeling is used in conjunction with hierarchical clustering methods to determine the optimal number of clusters. Algorithms (e.g., available from SAS/BASE and SAS/STAT from SAS Institute Inc.) can be used to estimate the mixture model component parameters and probabilities. The resulting clusters of stores are referred to as store groupings.

Next, store classification is performed by process 110 by using available information that characterizes the different individual stores (e.g., rural, urban, average market income, etc), together with the information as to what grouping the store was placed in, to determine key store characteristics that lead to their classification into a particular store grouping. Armed with the results of this analysis, the store classification process 110 knows where a new store, or a store with incomplete sales information should be assigned to the existing store groups, based on the characteristics of the store.

The system returns to the store, SKU, weekly level "adjusted" POS data and then aggregates these data by store group. Thus, the system ends up with many different weekly SKU-level data series for each store group.

The most appropriate level in the product hierarchy is used in order to estimate the size distribution profiles. For example, if the SKUs in a particular product class are very similar in all aspects (e.g., demand characteristics), a more reliable estimate of the size distribution may be made at the class level rather than at the SKU level. On the other hand, if their demand characteristics vary significantly, the most reliable estimate of the size distributions may be made at the SKU level. In order to determine the best level in the product hierarchy, cross validation methods may be used. These methods compare various forecasts at each product level to determine the level at which to obtain the most reliable forecasts by process 104.

Figure 4:
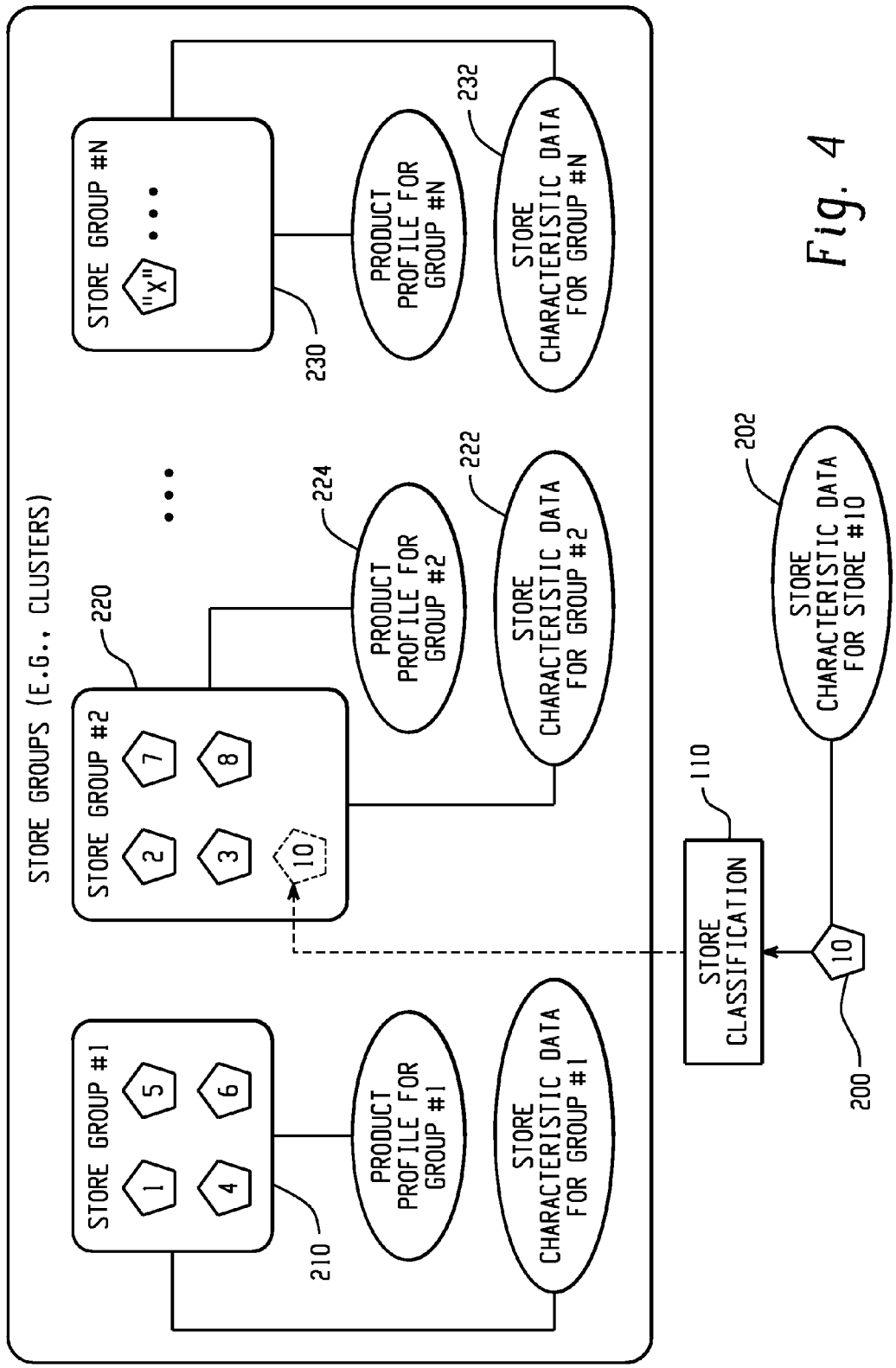
FIGS. 4 and 5 are block diagrams depicting examples of classification of a store and generation of product estimations.
Figure 5:
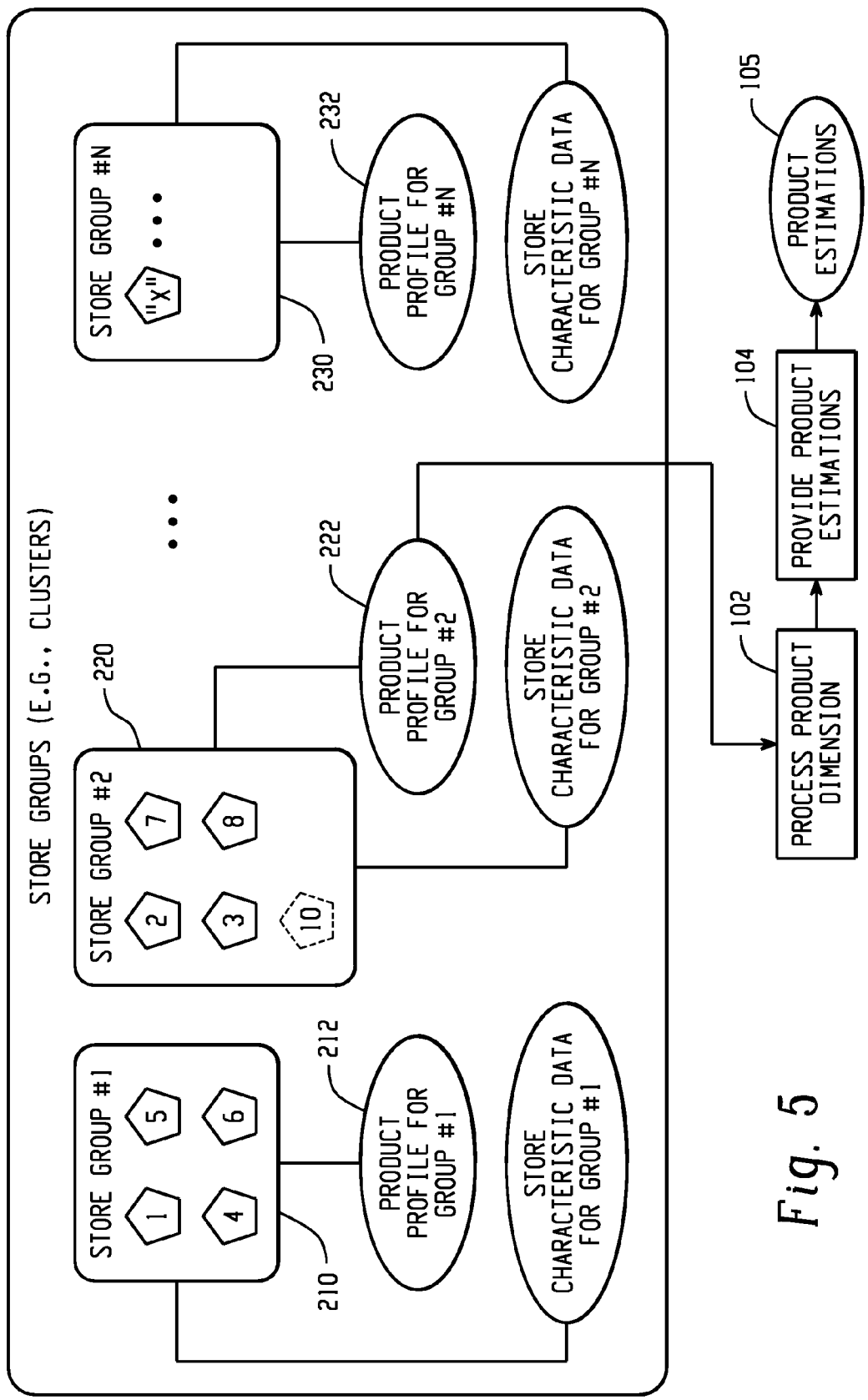

FIGS. 4 and 5 respectively illustrate an example of classification of a store by process 110 and product estimations being generated by process 104. With reference to FIG. 4, an additional store (i.e., store #10 shown at 200) needs to be classified (e.g., needs to be assigned to a particular store group). The store characteristics 202 for store #10 are analyzed with respect to each of the group's store characteristic data (212, 222, 232) to determine with which store group (e.g., groups 210, 220, 230) store #10 should be associated. In this example, it is determined that store #10 should be classified in store group #2 (i.e., group 220). Because of this association, the product profile 224 for group #2 will be used in providing product estimates as shown in FIG. 5 when product estimations are to be generated with respect to store #10.

Figure 6:
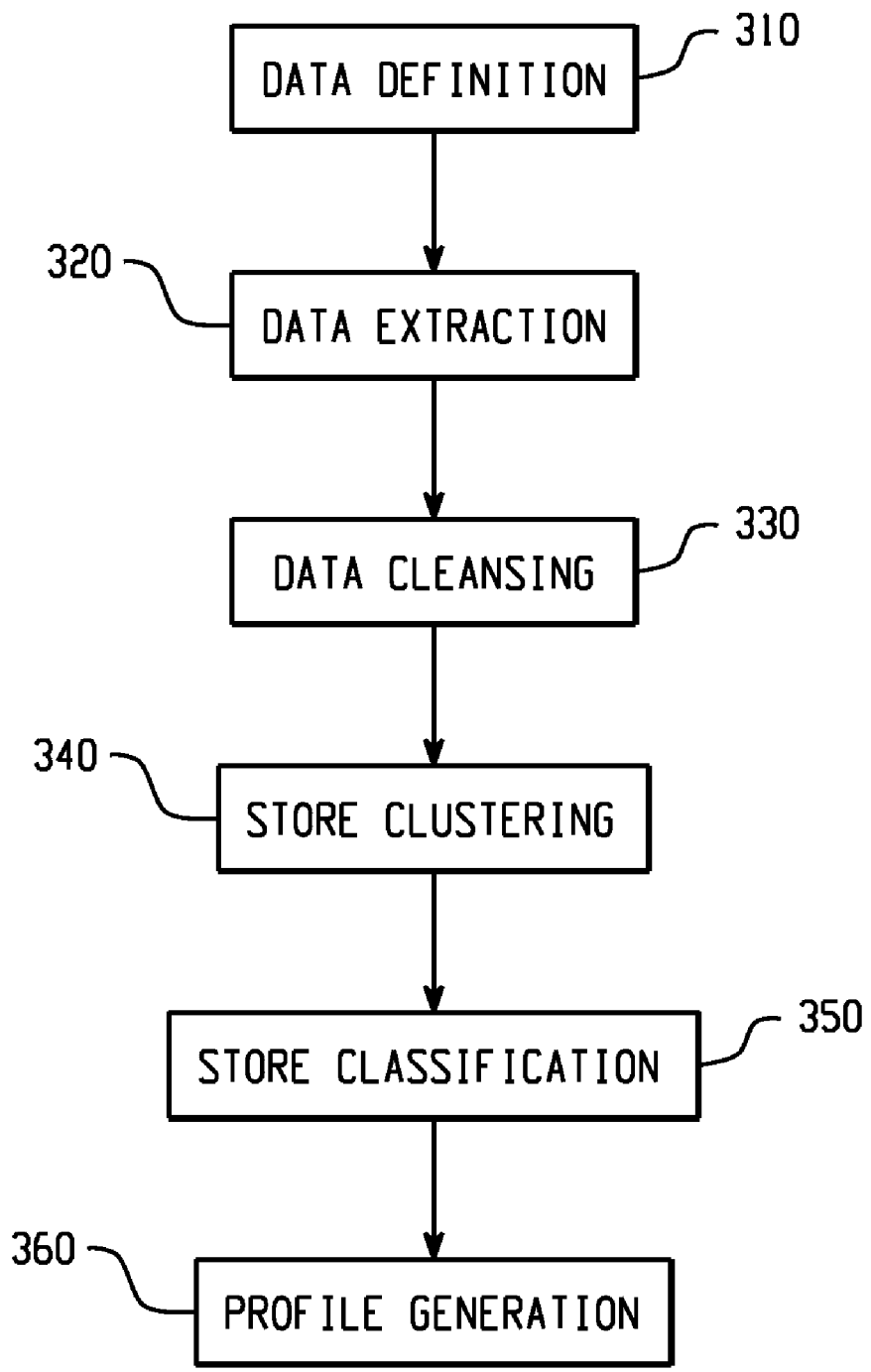
FIG. 6 is a flowchart depicting an operational scenario for generating product estimations.

As noted above, the processing flows described herein can be performed in many different ways. FIG. 6 provides another operational scenario for generating product estimations. With reference to FIG. 6, a user defines data projects for profile generation at process 310. Process 310 allows a user to specify what product scope and time scope are to form the basis of the analysis. At process 320, raw data is extracted based on the product scope and time scope defined in the data projects by the user. As an illustration, the product scope and time scope can be Misses bottoms for the upcoming fall season, and fact data could be weekly sales and inventory, and geographical/product status data for each style-color-size under Misses bottoms of all stores. As another illustration, a user can specify that multiple product scopes and time scopes can be analyzed: a user can define two data projects, "Men's Department—bottom" and "Men's Department—sport shoes," the first for the fall season, and the second for the winter season.

Process 330 cleanses the data and removes noise as well as imputing constraint(s) or no sales (e.g., due to being out-of-stock) to the data. Processes 340 and 350 are performed for each size-set that needs to be addressed. More specifically, process 340 performs store clustering for each size-set involved in the analysis. In the store clustering process 340, the data is (a) aggregated on a time dimension across all weekly periods, and (b) aggregated for each size in the size-set across all style-colors that have the same size-set. This results in a size unit for each size in the size-set, for each store at the level of Misses bottoms. This data is used to determine store clusters or groups. Process 340 can be configured such that depending on users configurations, certain stores such as non-comparable stores are to be removed from consideration by the store grouping clustering process 340.

After process 340 operates with respect to a size-set, process 350 on FIG. 6 performs store classification. Based on the store grouping results, a store classification model will be built based on user-specified store characteristics. Stores that were not participating in the store grouping process are classified to one of the store groups. The store classification model is also utilized when future new stores are to be analyzed.

Process 360 in FIG. 6 generates profiles that are to be used in product estimations. First, in process 360 the cleansed data is aggregated to the level of a store group. For example, this can be done by taking the cleansed data and aggregating along the store groups for the location dimension, but retained on the time dimension for each period. Profiles are then generated for all nodes in the scope from the top-most level down to the target level.

The product scope is then analyzed for the generated size profiles as follows. A size distribution is determined at each node in the scope for each store group. The best distribution is assigned to each node based on the performance of its own distribution as compared to those of its ancestor nodes. A nodes is differentiated when that node requires a unique distribution which is significantly different from that of the top node in the scope. A profile is generated for each differentiated node, where a profile consists of one size distribution for each store group. The profile is then used to generate product price estimations.

Different types of users can perform different steps of the operational scenario depicted in FIG. 6. For example, an administrative user can extract data for consumption by an analyst. The scope of the data extraction depends on the data project defined by the analyst. A scenario could involve an analyst defining two data projects, "Men's Department—bottom" and "Men's Department—sport shoes," both for the fall season. A data extraction information table (that contains the product and time scope of the two data projects) is populated and visible to the administrator for the actual data extraction.

The extracted data set is referred to in this example as the "Raw Dataset," and the "Raw Dataset" is loaded into a staging area from the host system. The "Raw Dataset" contains standard sizes that are potentially "size-mapped" during ETL (extracting, transforming and loading) if not before extraction from a host system. Some amount of cleansing could be done during the ETL process as well, resulting in a "Cleansed Extract Dataset."

The analyst can generate profiles, utilizing the extracted data sets, through a data project. Within a data project, an analyst could set up multiple store grouping and profiling scenarios as described in more detail below. Each analysis contains a unique input configuration setting, and associated result. The analyst is then able to publish the outputs of satisfactory scenarios.

Figure 7:
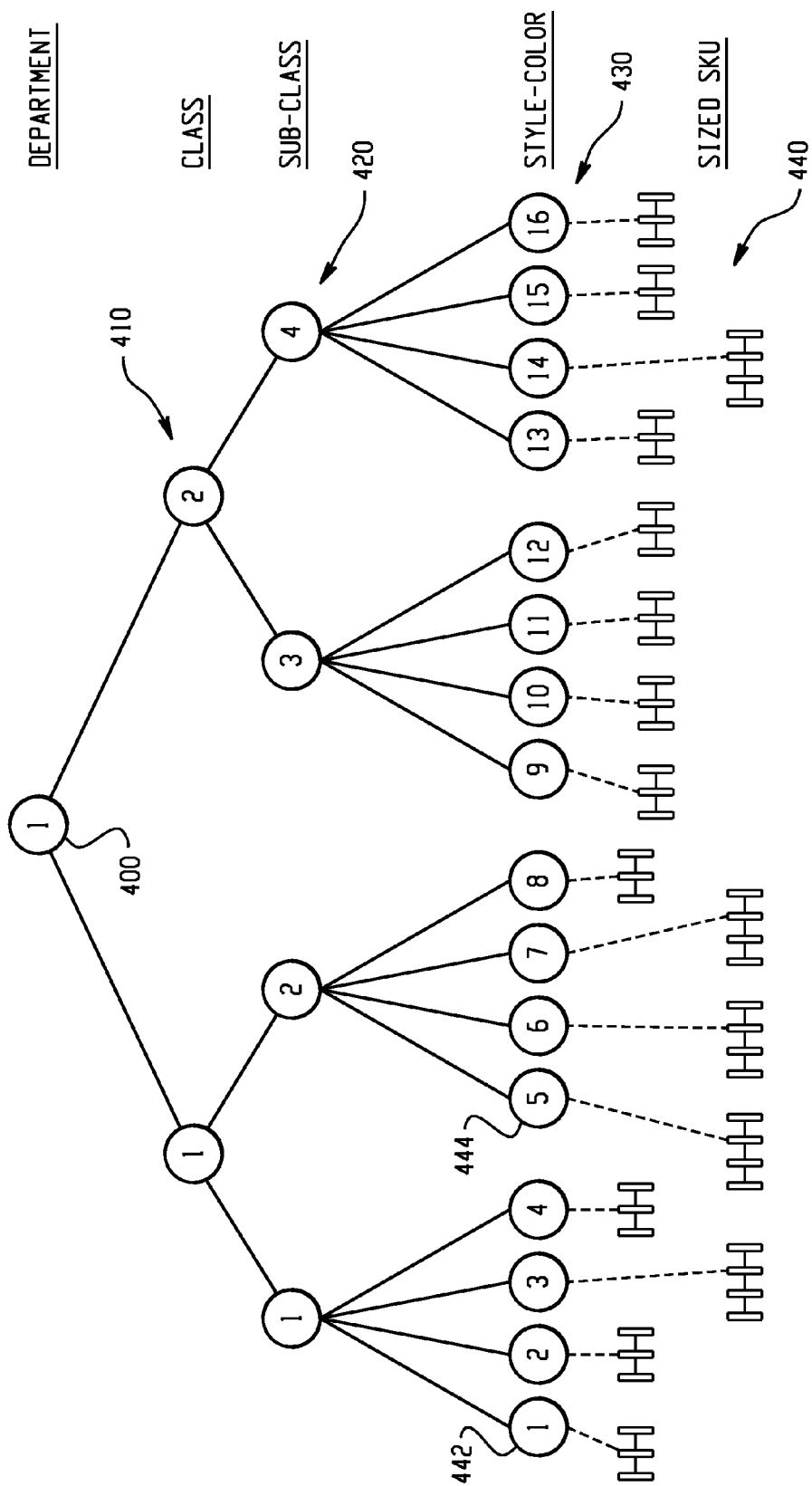
FIG. 7 depicts a product scope for use in a data project.

To illustrate a scenario of a data project and its analysis, the following example uses the following data project information:

- 16 Style-Colors (e.g., different colors of products) under a department (as shown at 430 in FIG. 7).
- 11 Stores (Store #9 is non-comparative, and Store #11 is a planned future store)
- 13 weekly time periods considered
- 2 size-sets {S, M, L} and {XS, S, M, L} (as shown at 440 in FIG. 7)
- Selling season, for all 16 items, is the same 13 week period, in all 10 stores.
- Each store sells all sizes in the size-set of each style-color
- Only 1 year's worth of seasonal data is necessary for analysis
- "Raw extracted dataset" for Department 1 exists Based upon the above information, the data project establishes a specific scope (product, time periods, and all stores) to be analyzed. As depicted in FIG. 7, a product scope is specified for the data project in a form of a product hierarchy. The hierarchy contains a department node 400 that breaks down into two product class nodes 410. The product class nodes 410 further break down into four product sub-class nodes 420, followed by sixteen style-color nodes 430, and then finally into the more specific sized SKU nodes 440.

Each of the sized SKU nodes represents one of the two size-sets being analyzed in the data project. For example, sized SKU node 442 is the size-set {S, M, L}, while sized SKU node 444 is the size-set {XS, S, M, L}.

A user can access the screens shown in FIGS. 8A-10 for creating the instant data project that will analyze the scenario described above. Through these screens, the user specifies the scope of the analysis as:

- Product Scope: Department Node 1 and every node below it.
- Time Scope: 13 weeks of a season, by specifying the season's Start and End Date.

Figure 8A:
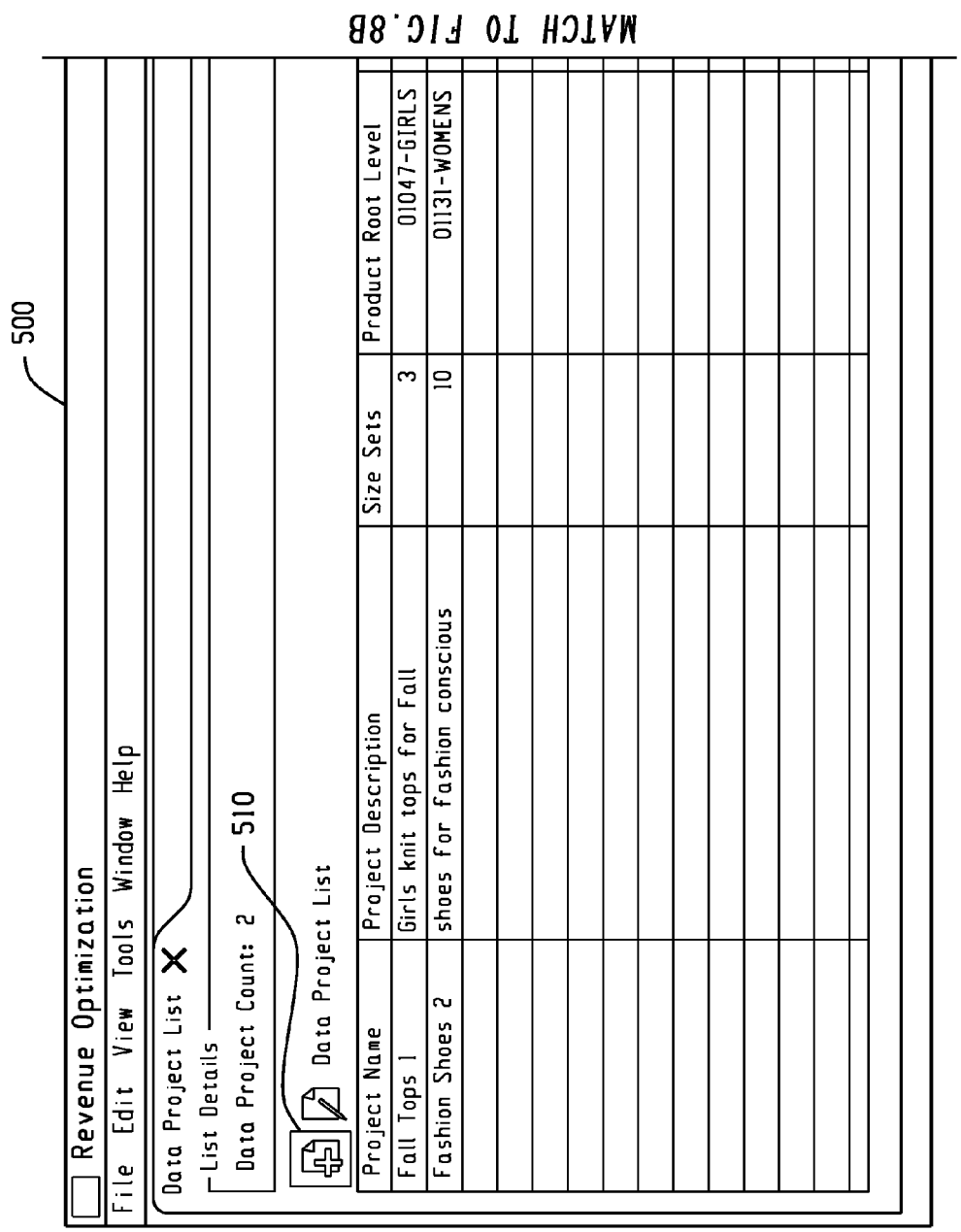
Figure 8B:
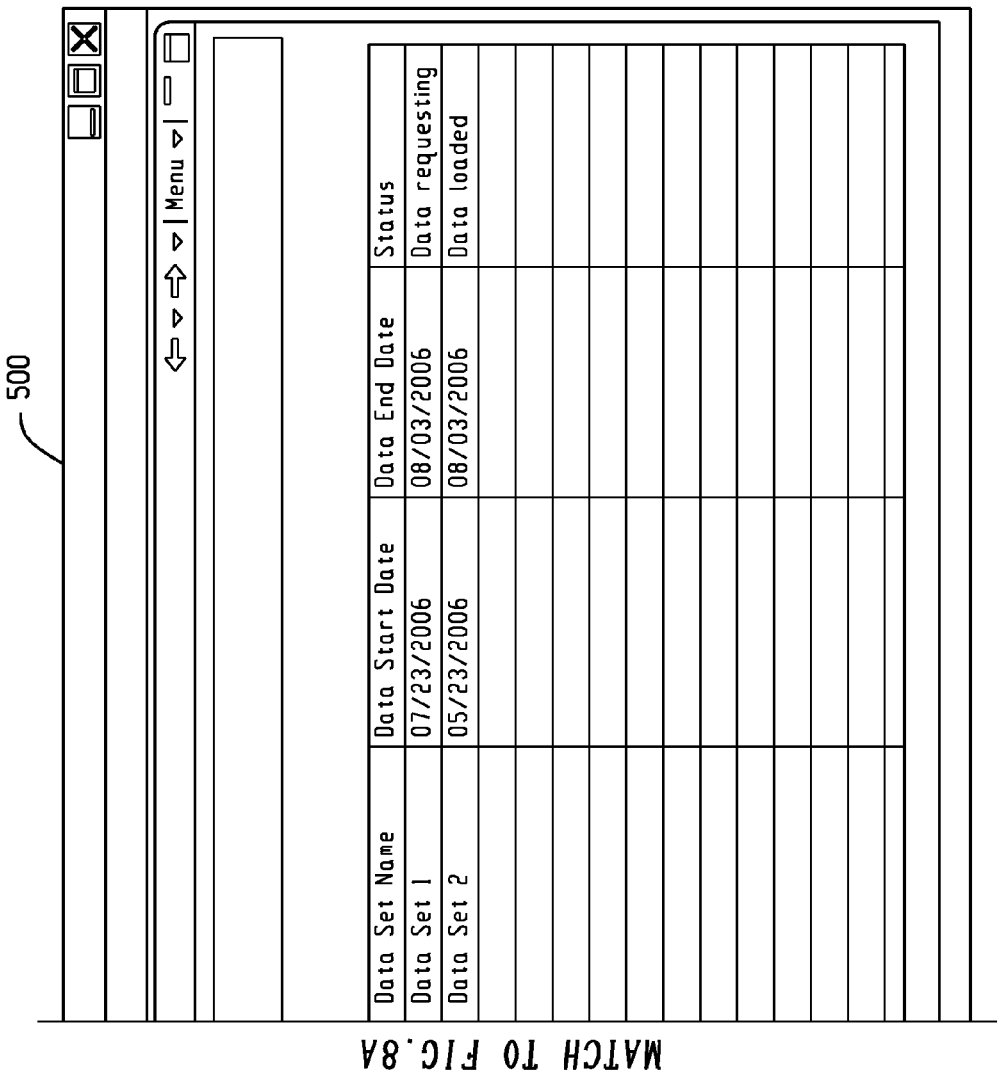

To specify the scope of the analysis, a user first creates a data project through screen 500 displayed on FIGS. 8A-8B by clicking on interface item 510. The data project list portion of 500 provides a list of which projects have been created as well as top-level information about a project, such as: a project description, the number of size-sets that are analyzed within the project, what level within a product scope hierarchy is the root level of analysis, a data set name, a start and end date associated with the project, and the current status of the project. Accordingly after the new project has been created by the user, it will be shown on screen 500 in the data project list portion of screen 500 along with top-level information about the project.

Figure 9:
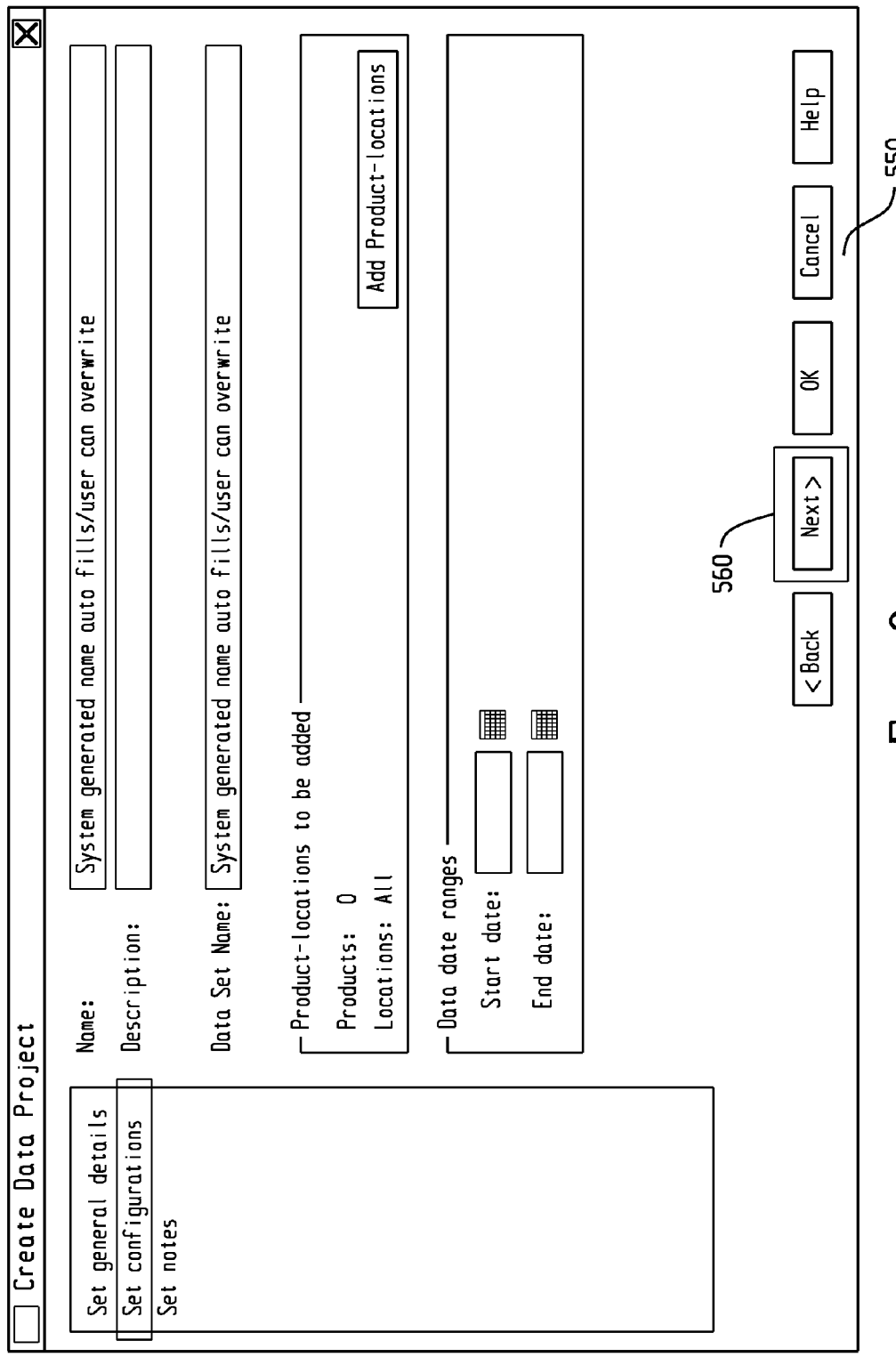

Screen 550 on FIG. 9 allows the user to enter general information about the data project to be created such as: a project name, a project description, name of the project's data set name, product locations to be added, and the data date ranges. It is noted that all store locations have been indicated for this data project. The user clicks on interface item 560 in order to reach the next step in the data project creation process.

Figure 10:
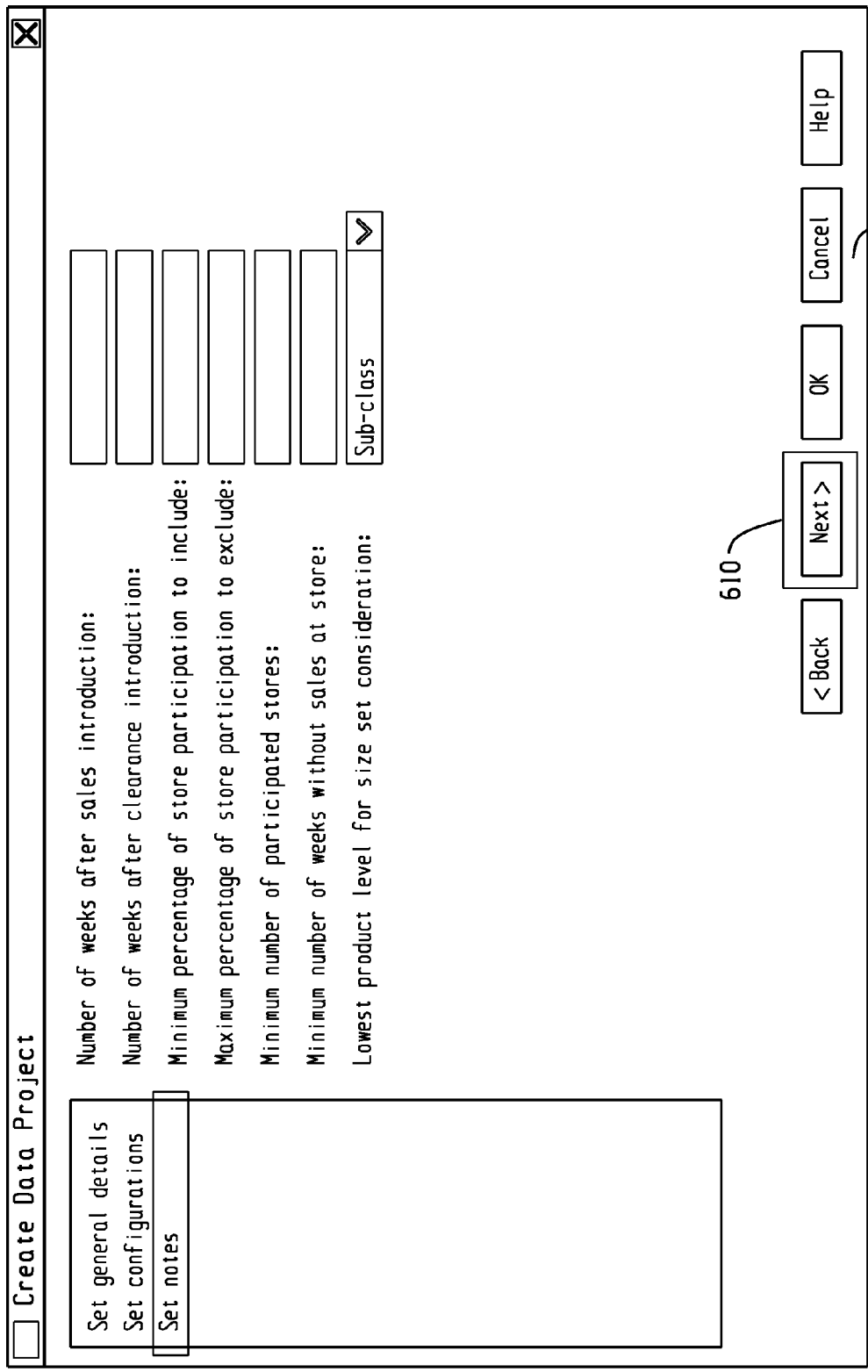

Screen 600 on FIG. 10 allows the user to enter notes about the data project such as: the number of weeks after sales introduction, number of weeks after clearance introduction, minimum percentage of store participation to include, maximum percentage of store participation to exclude, minimum number of participated stores, minimum number of weeks without sales at store, and lowest product level for sized set consideration. As an example of utilization of this information during data analysis, the minimum number of weeks without sales at store information can be used to determine a threshold for what stores should be considered as a basis for forming groups of stores. The user clicks on interface item 610 in order to reach the next step.

The next step in this scenario is to extract the raw data for department 1 based on the project scope configurations. The extracted raw data for department 1 can include sales and inventory facts as well as geography/product status information. This results in sales and inventory units, for each time period, for each size in the size-set, of each style-color, for each store. The results are then placed in a data staging area for subsequent processing.

As an illustration, data extraction results are shown at 650 in FIG. 11 for sales data alone, for each style-color and all stores. (This would be similar for inventory data.) FIG. 11 shows at 650 a breakdown for each of the 13 time periods the product unit numbers associated with each style-color as well as a break down of the information on a per size and a per store basis. For example, the first row of the table shown at 650 breaks down the product numbers associated with store 1 with respect to "small" sized products. The chart associated with tab 660 shows such information for style-color 2. With the extracted data, the system determines all size-sets that exist in the raw data based upon sales and inventory facts as well as the previously defined user inputs.

Figure 12A:
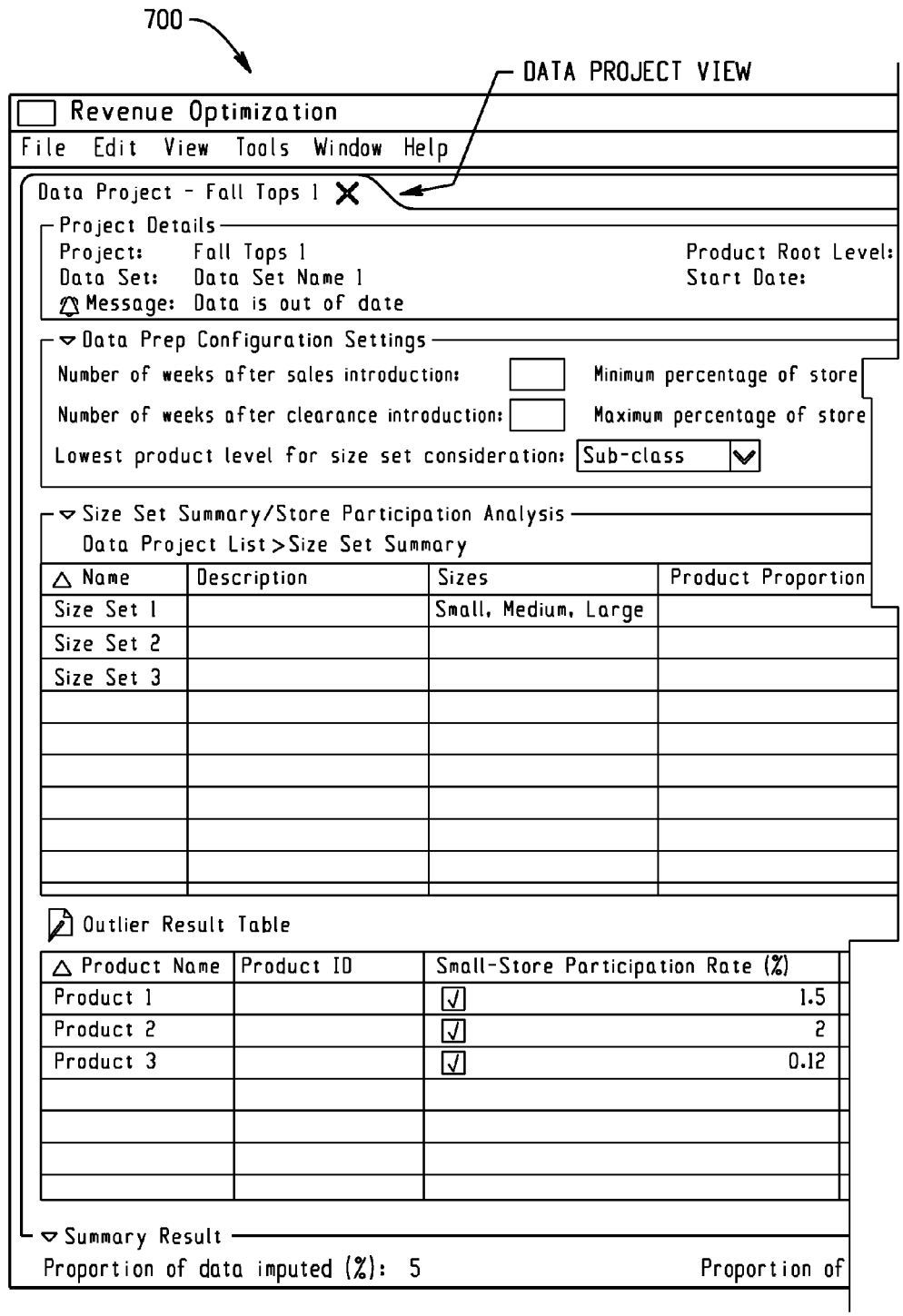
Figure 12B:
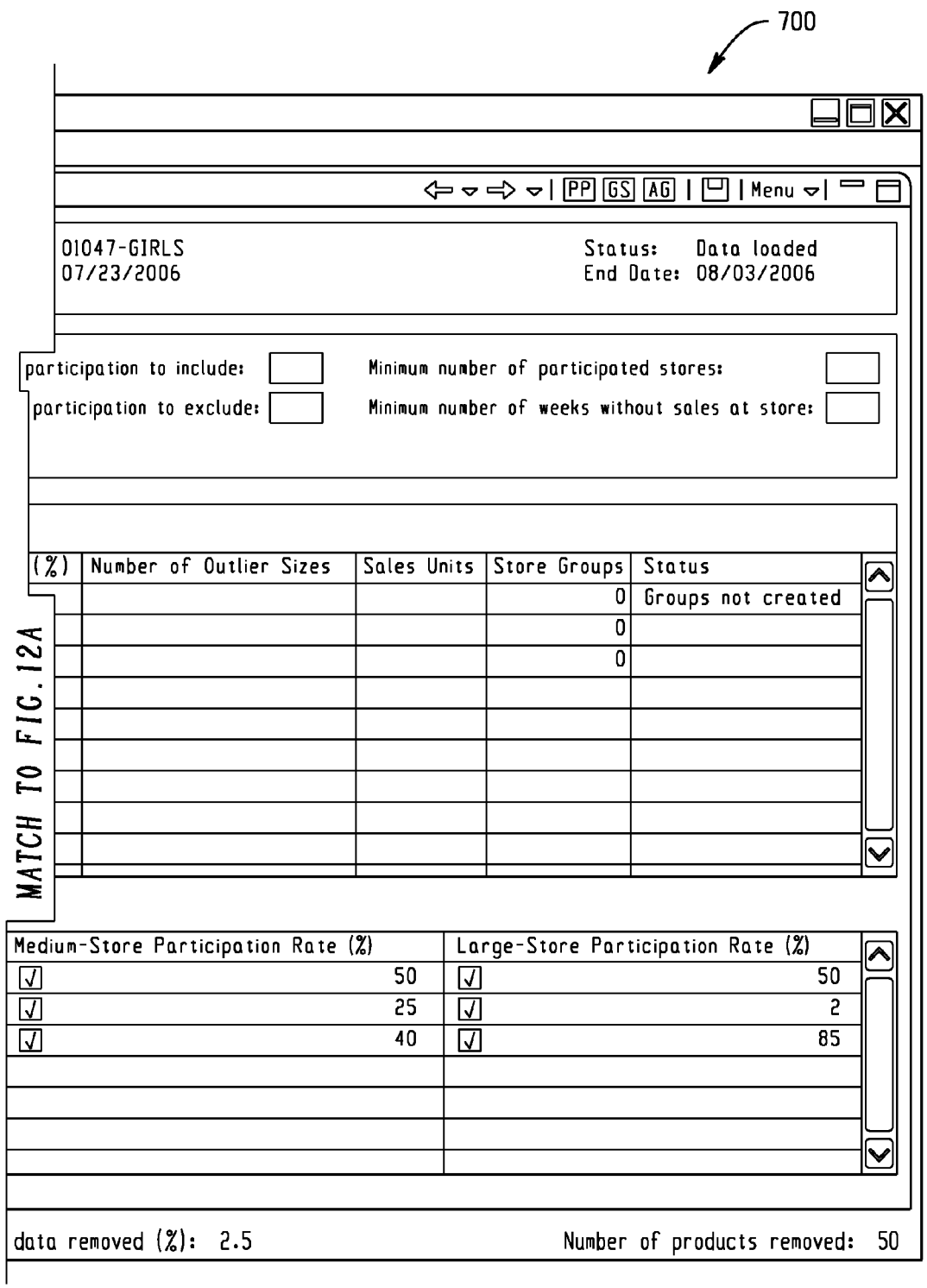

As shown on screen 700 of FIGS. 12A-12B, a user can examine certain information to identify geography/product/size with insignificant sales, product size with insignificant sales across all stores, etc. A user can then examine the information associated with each of size-sets to identify which style-sizes they want to exclude from the next iteration of size-set identification. The system will recreate size-sets based on the input provided by the user.

A user can elect to perform data cleansing upon the extracted data. Based on configuration settings in the project, the dataset will be cleansed, such as by:

Comparing sales and inventory figures to determine if sales were constrained by supply and need adjustment (e.g., imputation).

Removing sales before and after a certain shelf life.

Figure 13:
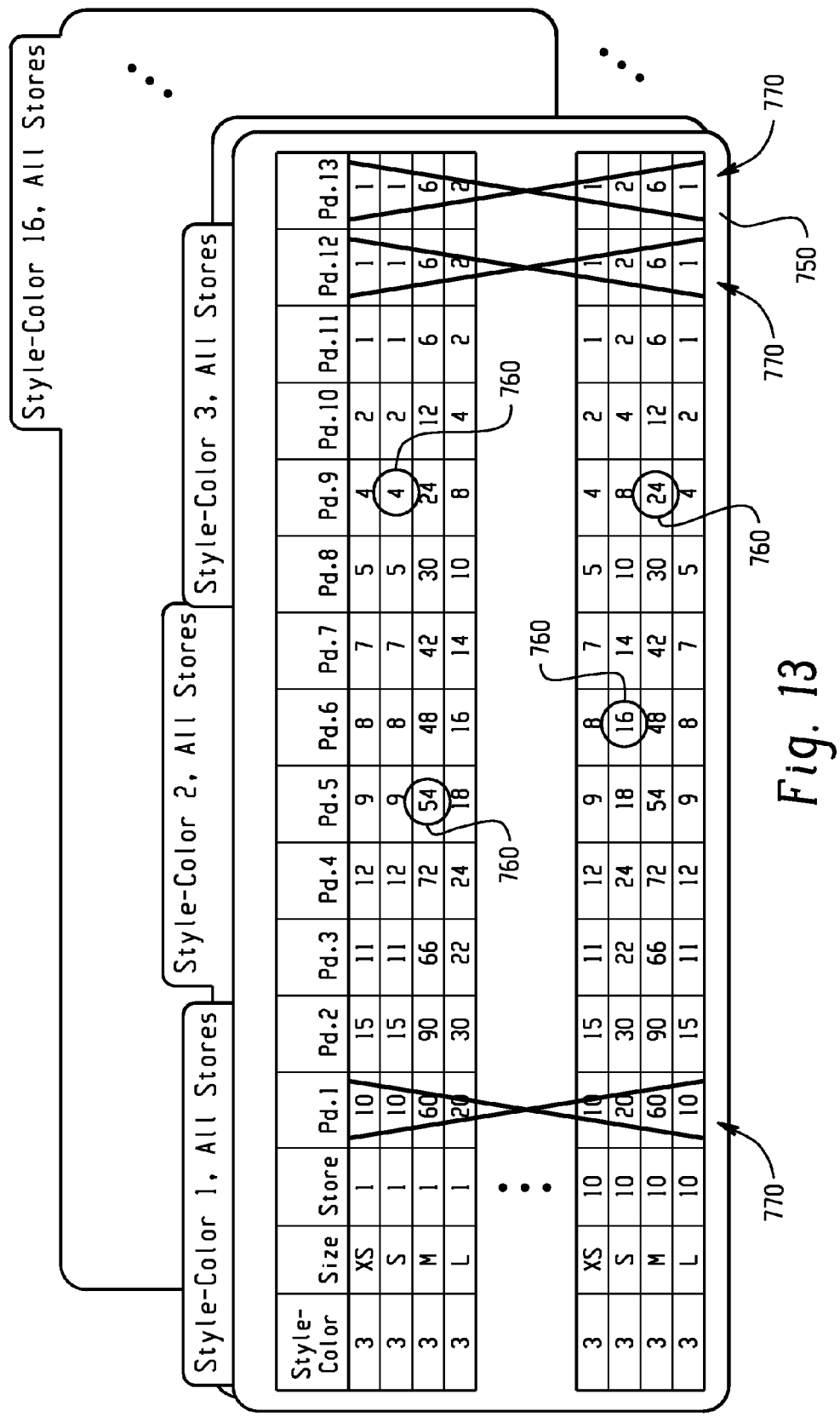

At the end of this step, the format of data is the same only the quality is improved. Data cleansing is shown at 750 in FIG. 13 for the four sizes of style-color #3. Highlighted at 760, are cells whose sales units were modified to what sales would have been under perfect execution—that is, sales that are constrained by inventory are imputed. Also FIG. 13 shows at 770 that sales before and after certain shelf life are removed. The user will now be able to launch into the store grouping and classification phases of analysis using the cleansed dataset created in this step as an input. Otherwise, the system can move into this phase with applicable default values.

Figure 14A:
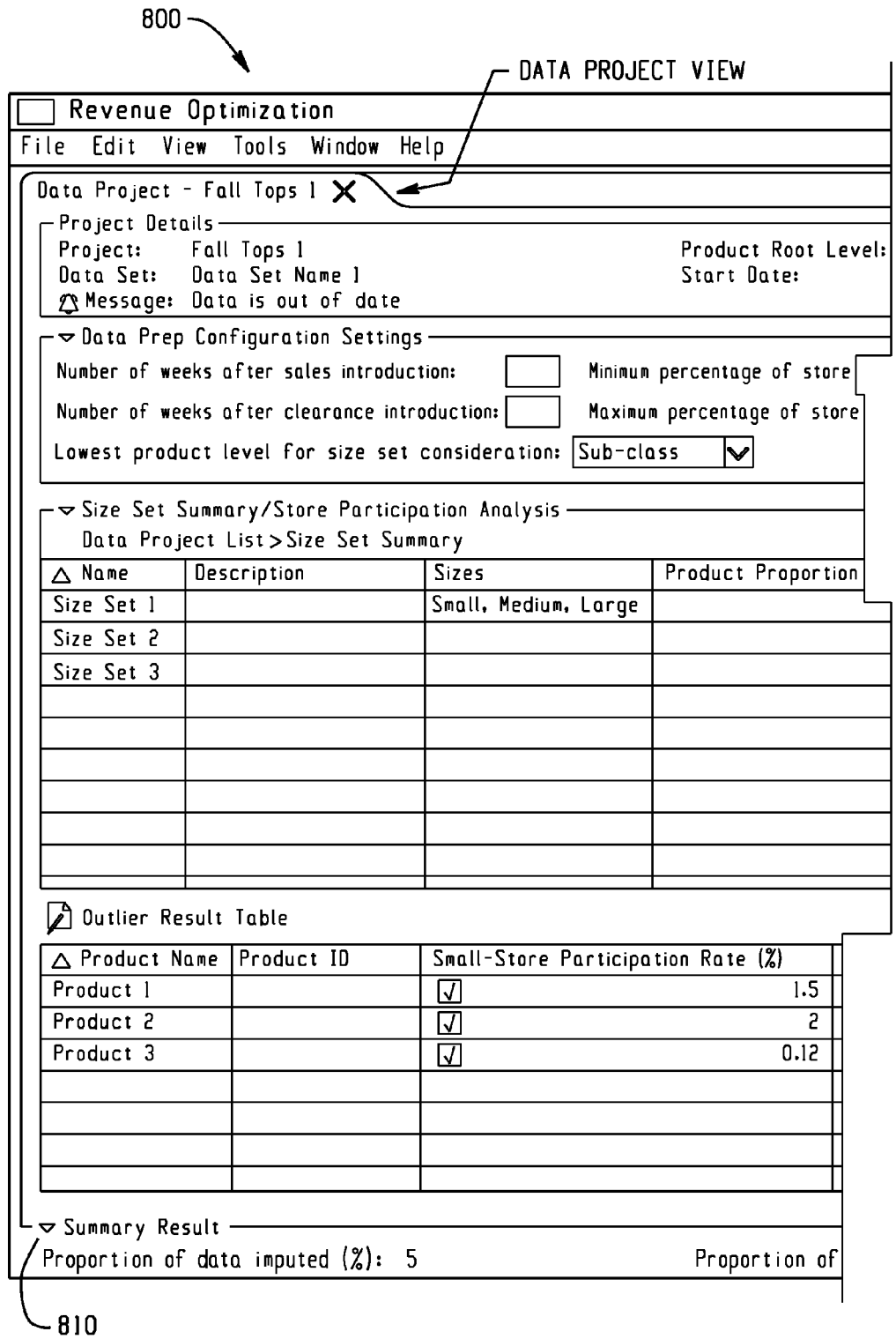
Figure 14B:
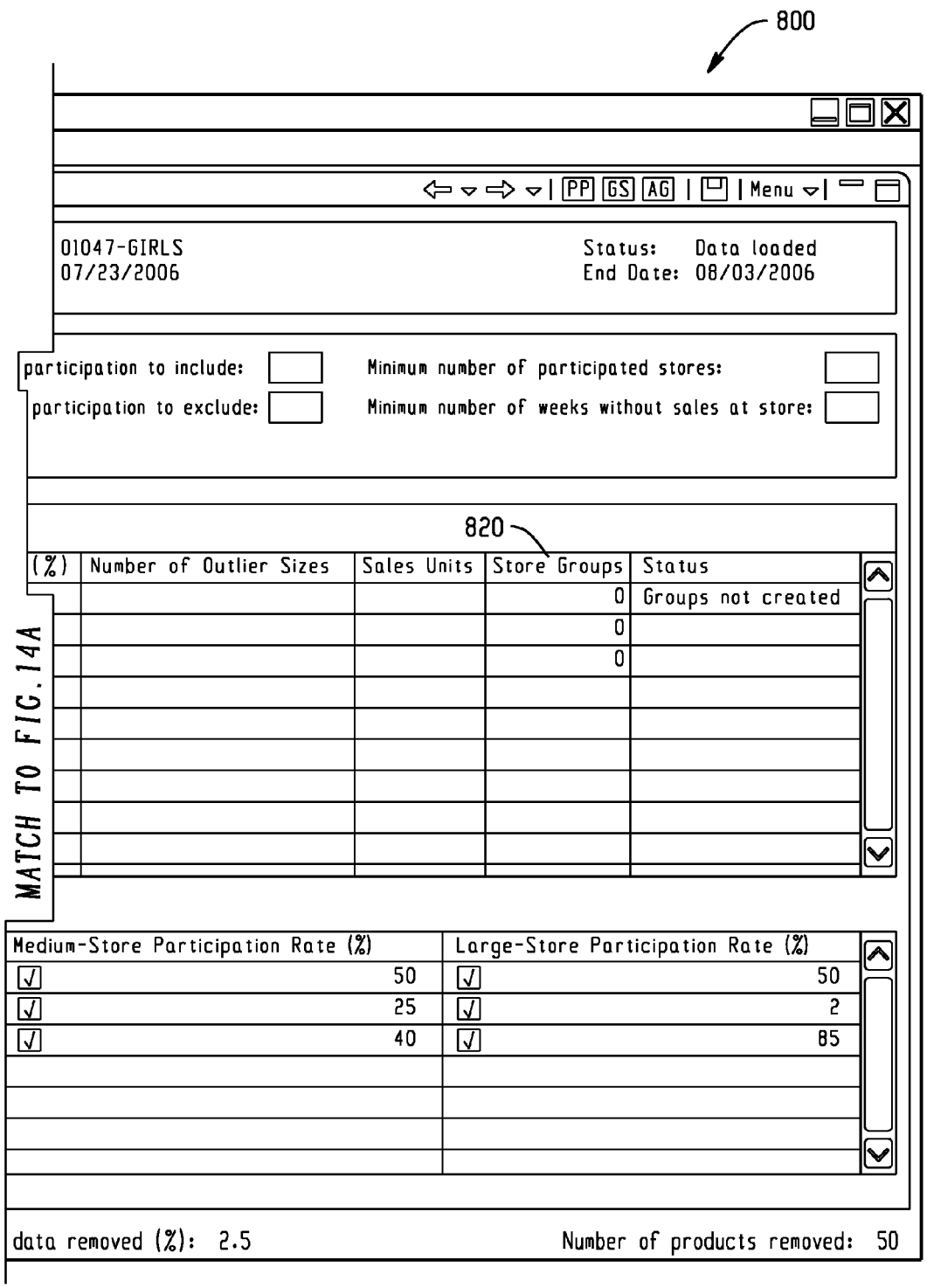

FIGS. 14A-14B show at 800 the data project view for the "Fall Tops" project. The data project view 800 contains a summary of the data cleansing results at 810. In this example, the proportion of data imputed was 5%; the proportion of data removed was 2.5%; and the number of products removed was 50.

The data project view 800 also indicates at 820 that store groups have not been created yet. Accordingly, the user specifies for the system to generate store groups for each size-set that is marked for analysis, based on applicable defaults (for a plan). In this scenario, a store grouping plan is the unit that maintains everything related to a product profile scenario within a data project.

Figure 15:
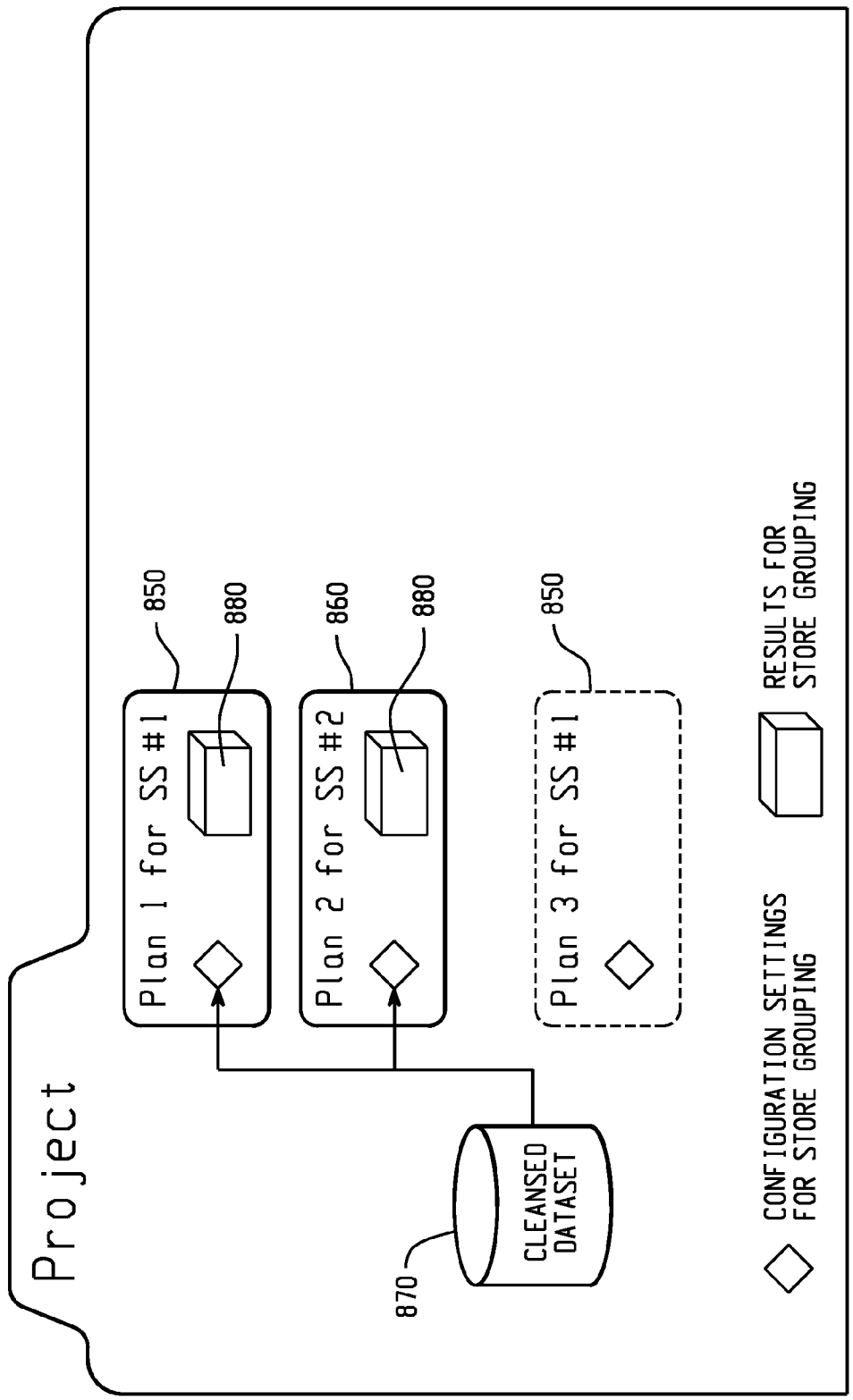
FIG. 15 is a display of a project having multiple plans to be analyzed.

As shown in FIG. 15, multiple store grouping plans can be created in a data project, such as two grouping plans for SS#1 and one grouping plan for SS#2 as shown at 850 and 860 respectively. (Note that the same size-set may be configured differently for analysis via separate plans.) FIG. 15 also provides another illustration of the many different types of views that can be presented to the user in providing a snapshot of the vast amount of data and detailed analysis that are being handled by the system. In this data project view, the cleansed data 870 (generated above) is shown as the input for analyzing the various plans 850 and 860.

The user selects plans 1 and 2 (850 and 860) for analysis. The system performs grouping/clustering of the stores associated with the selected plans. The system stores the grouping results with each plan as indicated at 880 in FIG. 15. If desired, the user can review the store grouping results, adjust configuration settings, and re-generate until satisfied.

Figure 16:
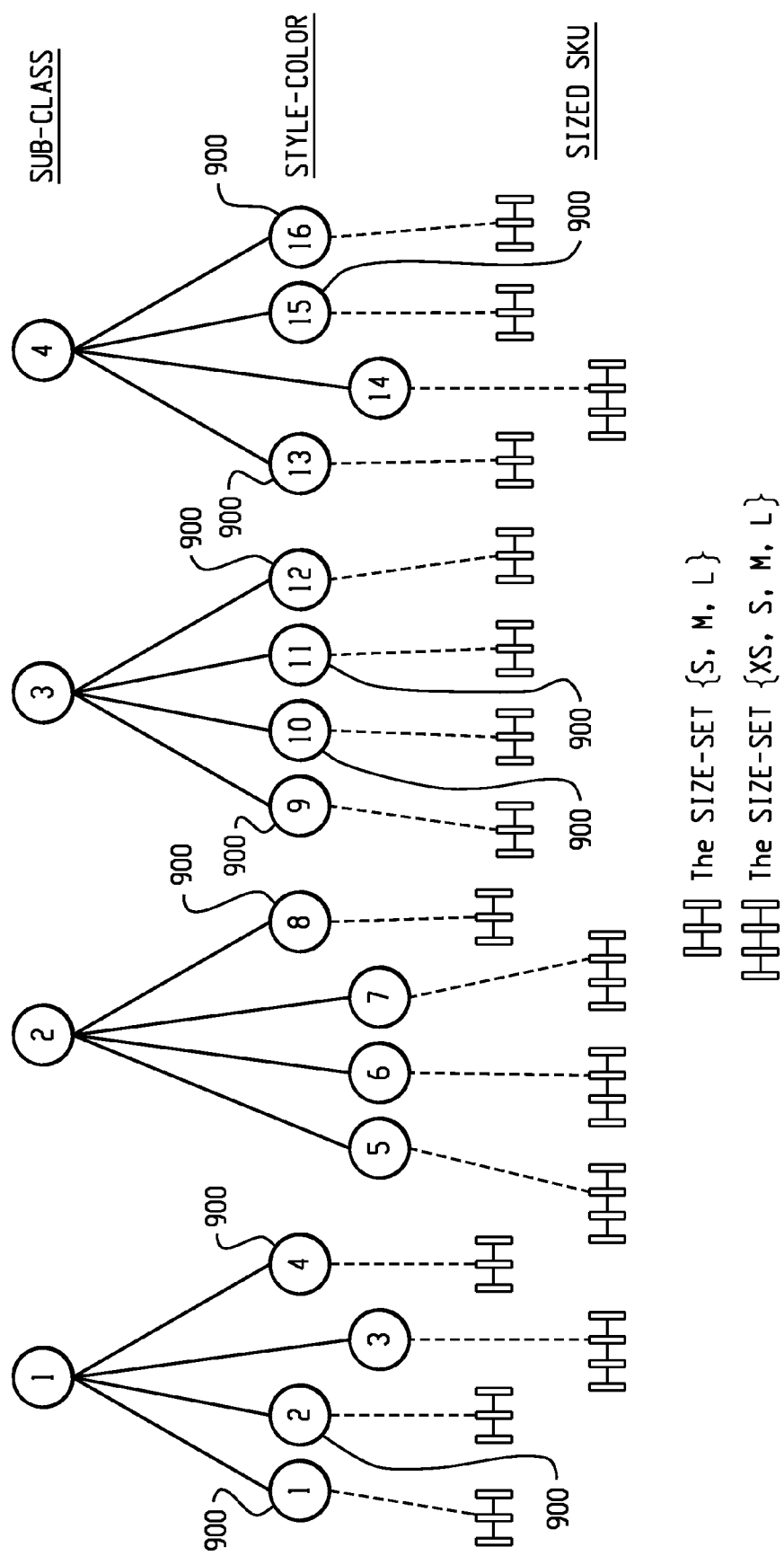
FIG. 16 is a display of style-colors to be analyzed.

To illustrate the data transformation at different steps within the store grouping process, consider plan 1 for SS (size-set) #1. Size distributions are needed for each store (for SS #1), to serve as the input for store grouping. At the beginning of this step, data exists at the style-color/size/time period/store level. This step generates data at the store/size level. This will be achieved via aggregation, over time periods and style-colors as illustrated by steps (a) and (b):

(a) Summarize Across All Time Periods. The system determines style-colors that will contribute data for analysis of SS#1. For plan 1 for SS #1, these are style-color #'s 1, 2, 4, 8, 9, 10, 11, 12, 13, 15, and 16, as indicated at 900 on FIG. 16. For each of these style-colors, sales data is aggregated over time-periods, for each store and size. This is shown in FIG. 17. With respect to FIG. 17, screen 950 shows style-color 1 as broken down by size and store across the 13 time periods. The last column on screen 950 is the aggregation for style-color 1 across all time periods for a particular store/size.

Figure 18:
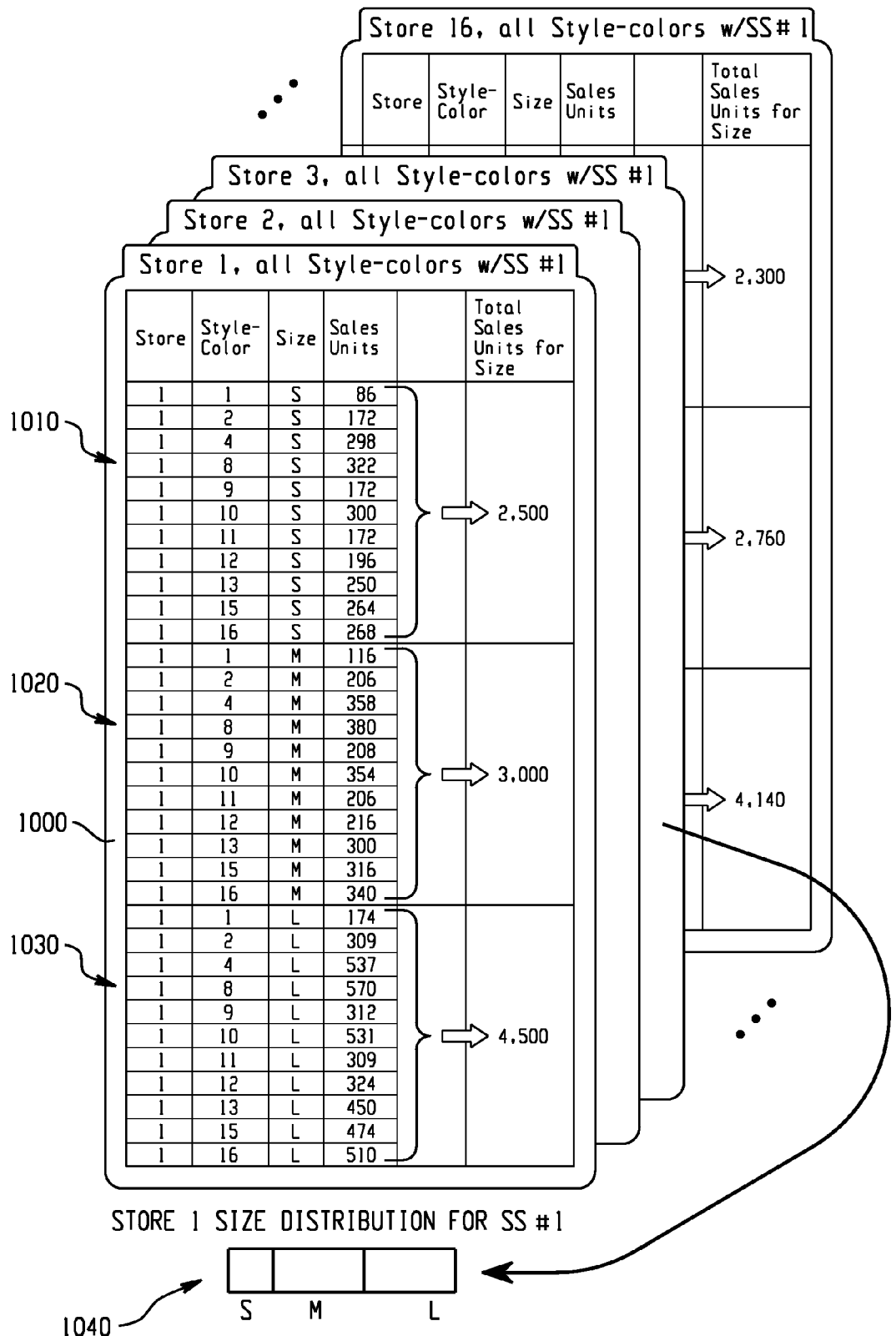
FIG. 18 is a display illustrating determination of store size distributions.

(b) Summarize Across Collected Style-Colors. As shown in FIG. 18, for each store and size, sales data is aggregated across contributing style-colors. Screen 1000 on FIG. 18 shows the sales data being aggregated for store 1 for all style-colors with SS #1. At the end of this step, the system has total sales units per size, considering time periods and collected style-colors, for each store. For example, the total sales unit for store 1 for the small sized items is 2500 as shown at 1010; the total sales unit for the medium sized items is 3000 as shown at 1020; and the total sales unit for the large sized items is 4500 as shown at 1010. This creates the small-medium-large distribution shown at 1040, wherein the large-sized items occupy the largest portion of the distribution spectrum because its total sales units were much larger than the total sales units for the other two sizes. More specifically, for store #1, this would be 25%, 30%, 45% for the three sizes. This data is summarized to provide a basis for the next step which is store group determination.

As part of the process in determining store groups, stores that have been determined as "new" or "non-comparable" based on the store grouping configurations are set aside for this step. For example, let us consider:

Store #11 (as shown at 1110 on FIG. 19) is a new store, planned to open 18 months from now.

Store #9 (as shown at 1100 on FIG. 19) is a "non-comparable" store, because it just started carrying items in Department 1 for the last six weeks.

Accordingly, sales data (hence size distribution) is not "completely" available for Stores #11 and #9. However, store characteristics (attributes, measures, etc.) are available.

Figure 19:
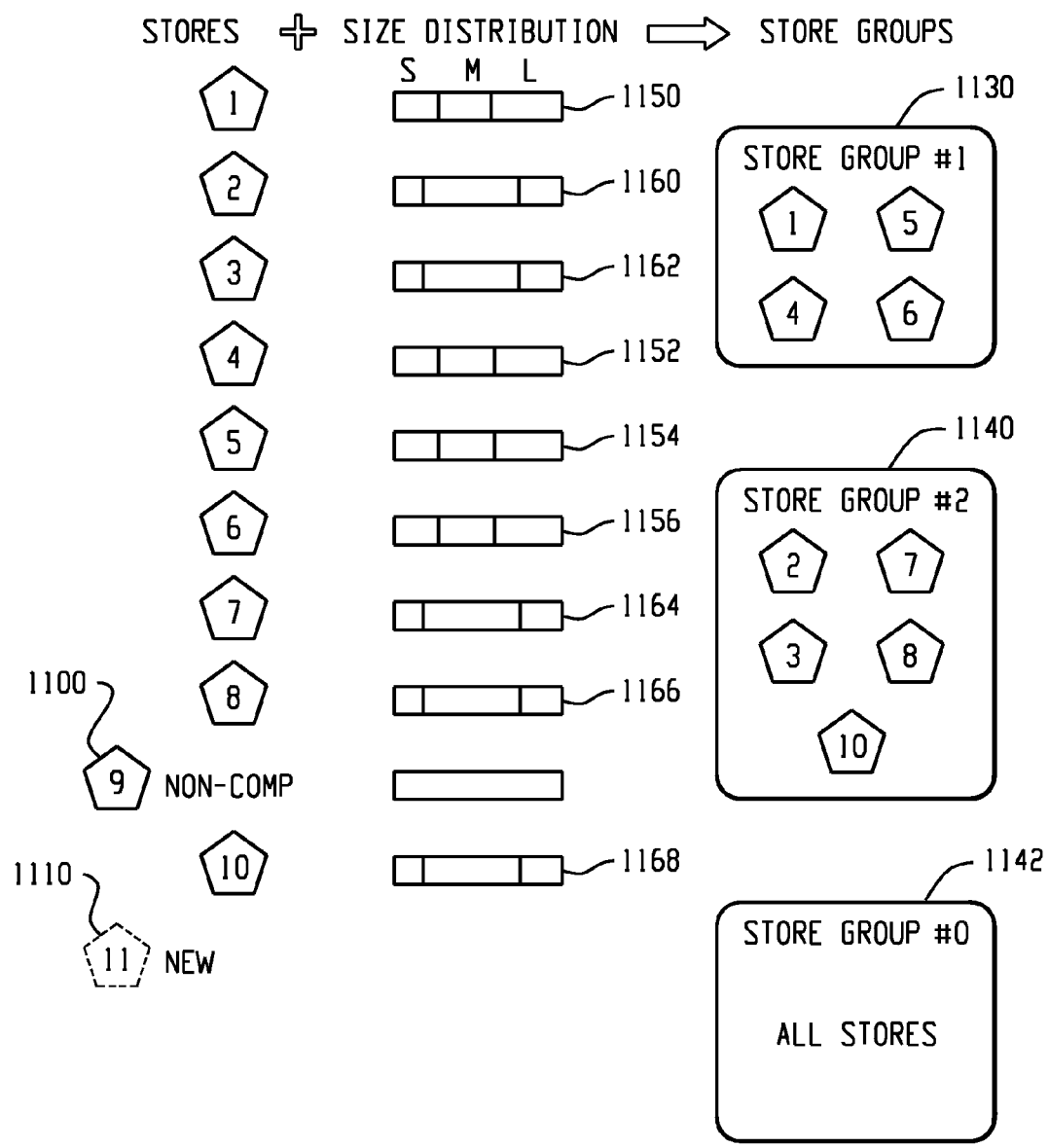
FIG. 19 is a display illustrating determination of store groups.

The system determines store groups based on each store's size distribution. In this example, two groups (1130 and 1140) are determined by the system as shown in FIG. 19. Group 1 (1130) includes stores 1, 4, 5, and 6 because of their similar size distributions. This is evident by comparing each of these stores' size distribution as shown at 1150, 1152, 1154, and 1156. Group 2 (1140) includes stores 2, 3, 7, 8, and 10 because of their similar size distributions. This is evident by comparing each of these stores' size distribution as shown at 1160, 1162, 1164, 1166, and 1168.

All of the stores could also be placed into an initial group (e.g., store group 0 (1150). This group serves as a default group for all product and/or stores that were excluded from the store grouping or store classification processes due to data exceptions (e.g., store 9 (1100) and store 11 (1110)). If desired, the user can review store groups, revise configuration settings, and re-generate store groups until satisfied. The user could select an "analysis" store characteristic in this step as part of the store grouping configuration setting, such as "store format." The system would first separate stores by "store format," then determine store groups within each set of stores based upon "format."

At this point, there is sufficient information to determine an overall size distribution for each store group, based on the size distribution of stores assigned to each group. (This would be equivalent to the profiles generated by the solution at a specific node.)

The system can proceed to classify the stores that need to be placed in a group. This step includes assigning to a group stores that he had been excluded from the store grouping process due to data exceptions (e.g., store 9 (1100) and store 11 (1110)).

Figure 20:
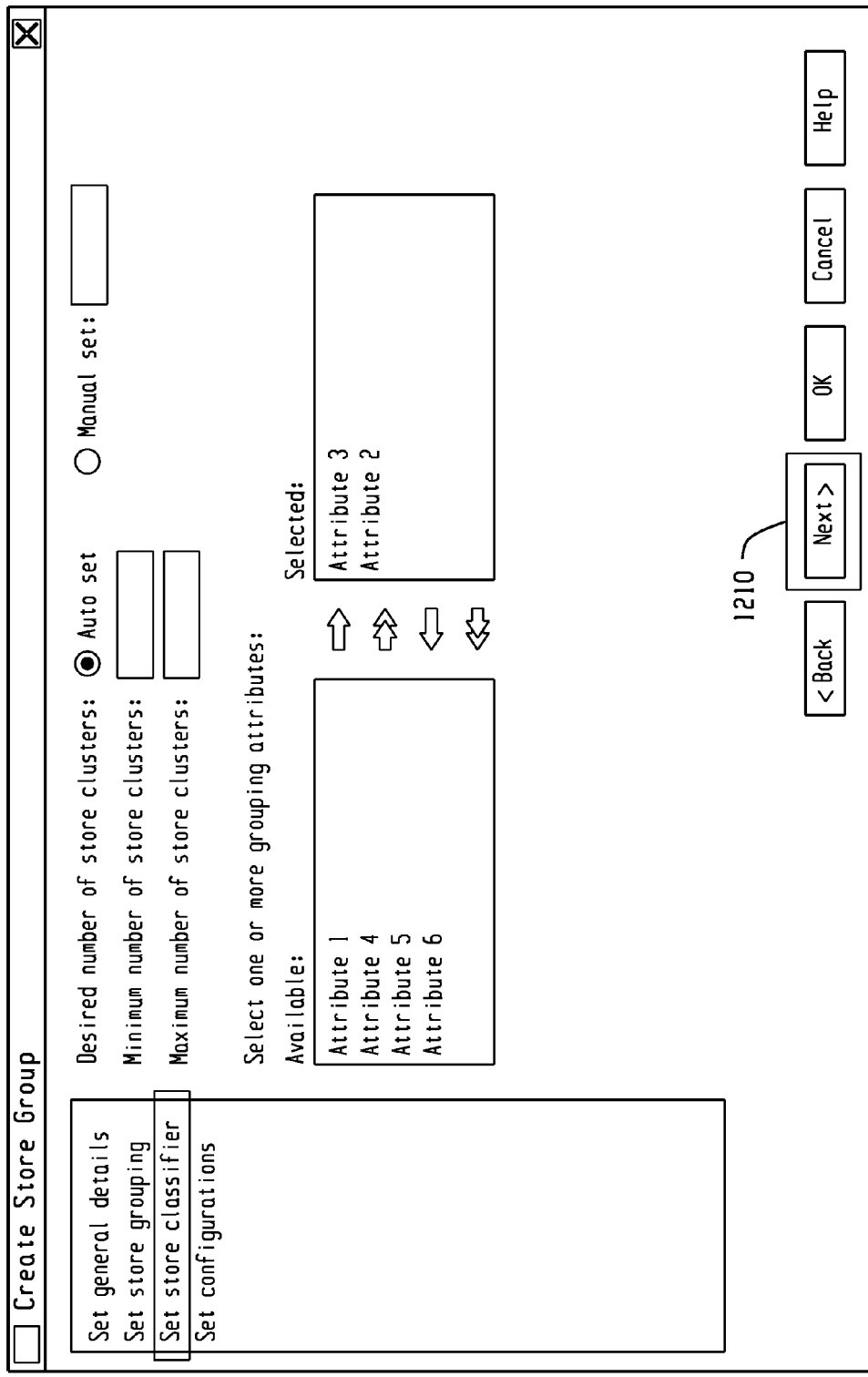
FIG. 20 is graphical user interface for initiating a store classification process.
Figure 21A:
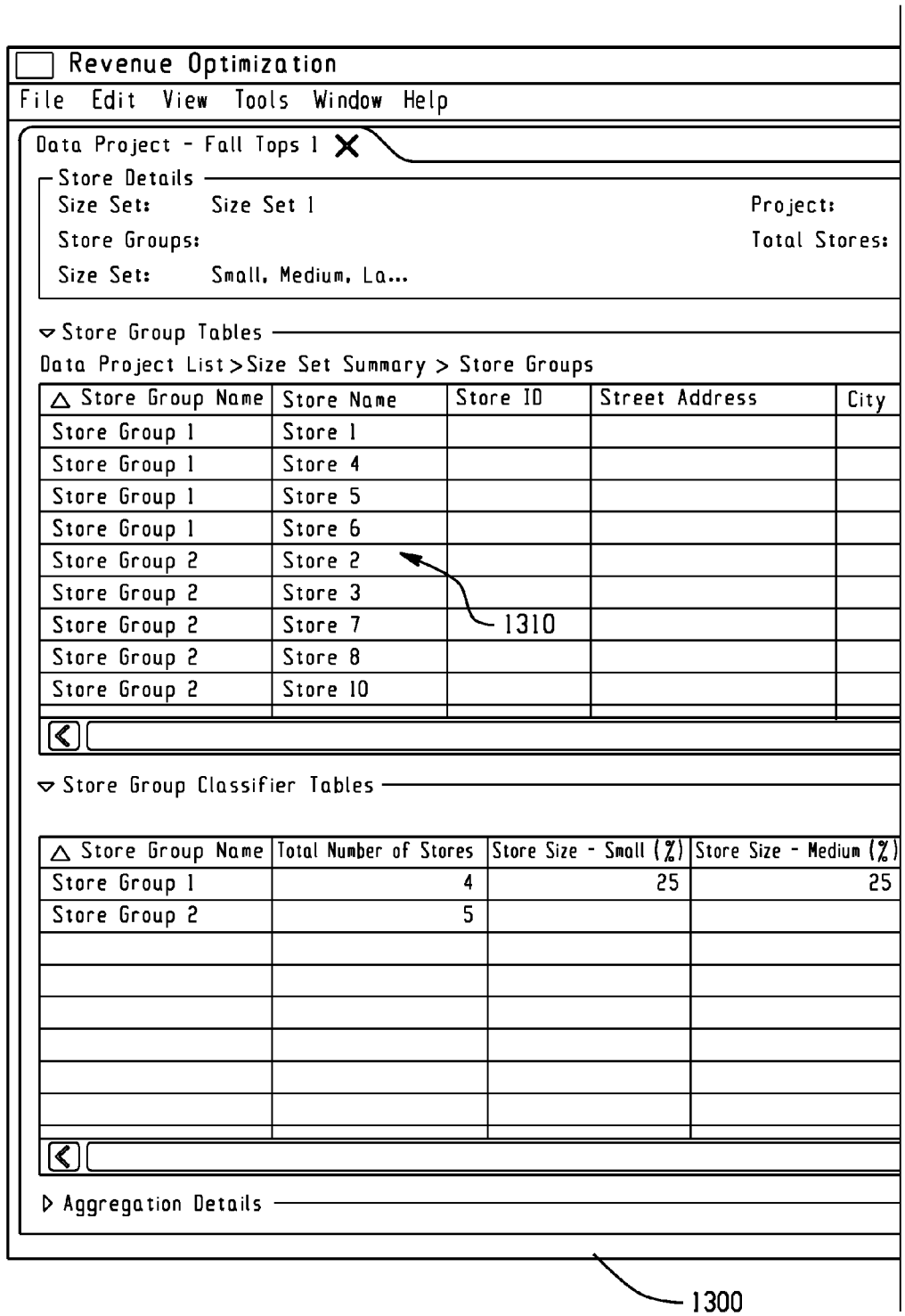
FIGS. 21A-21B are graphical user interfaces depicting which stores have been assigned to which store groups.
Figure 21B:
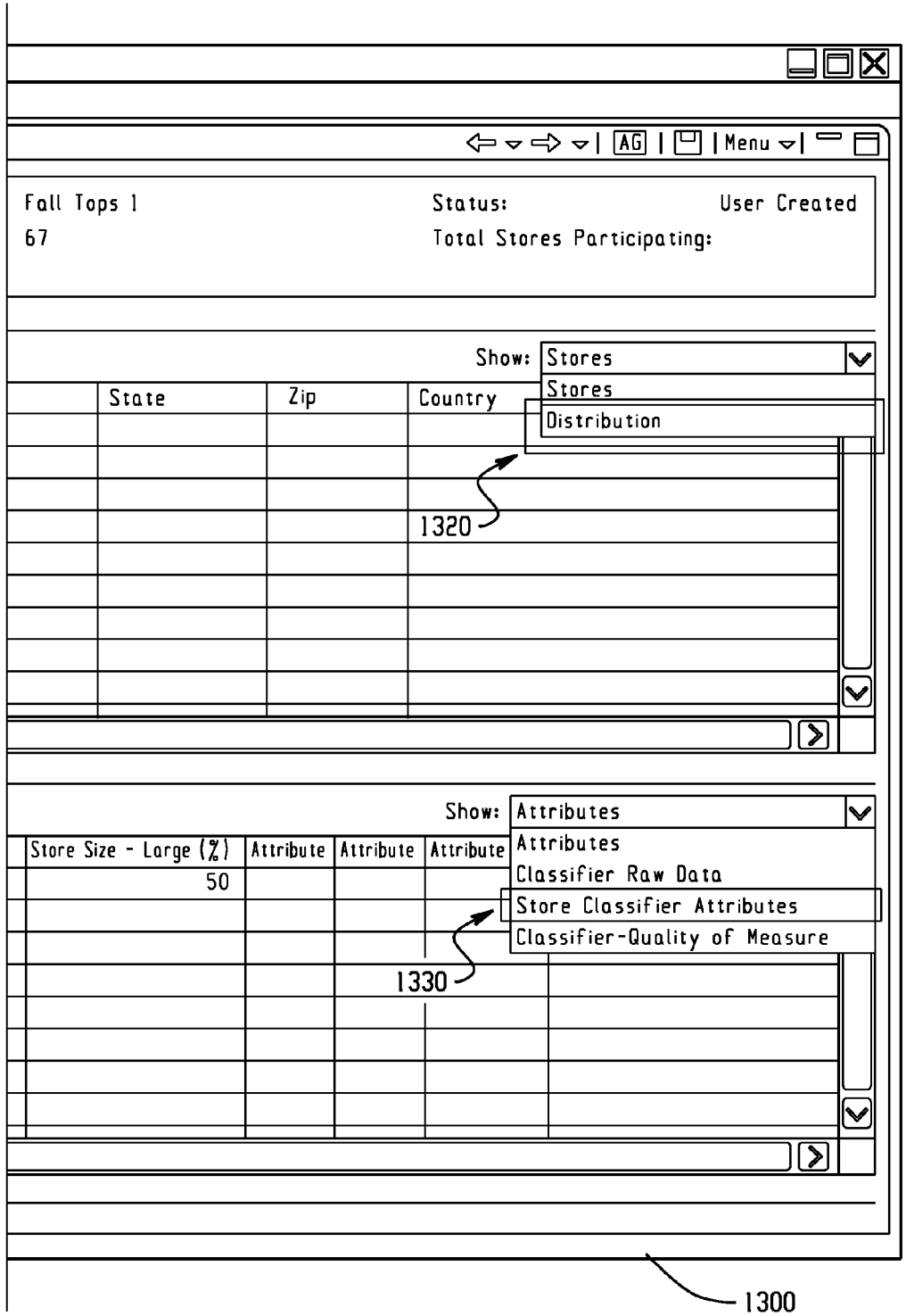

A user can initiate the classification process via screen 1200 shown on FIG. 20. The user sets the store grouping options (e.g., designed number of store clusters, minimums and maximum number of store clusters) and clicks on the next button as shown at 1210. Screen 1300 on FIGS. 21A-21B allows the user to view at 1310 which stores have been assigned to which store groups. Screen 1300 also allows the user to change table views for size-set 1 as indicated at 1320 and 1330.

Figure 22:
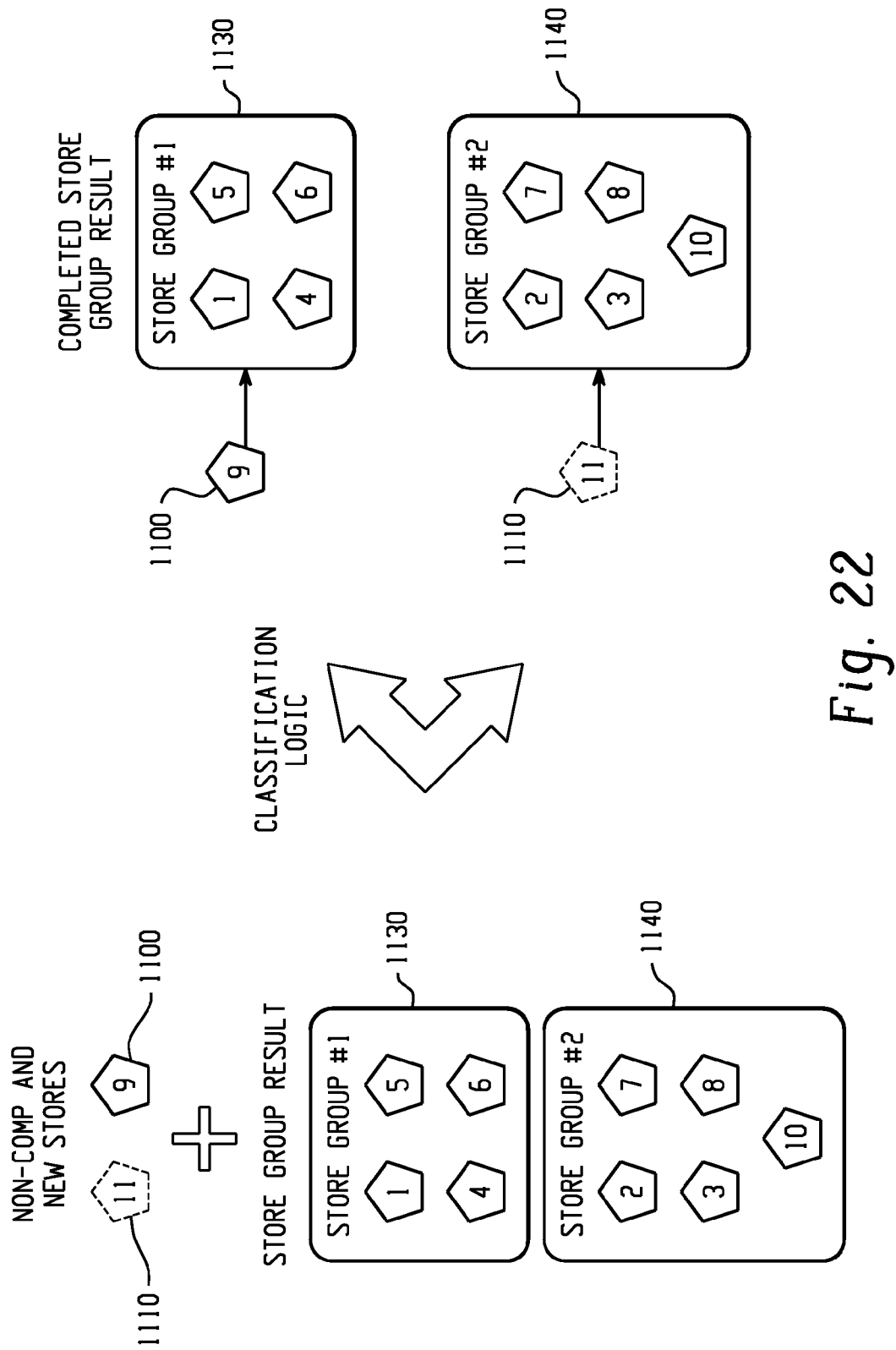
FIG. 22 is a flow diagram illustrating classification of stores to store groups.
Figure 23:
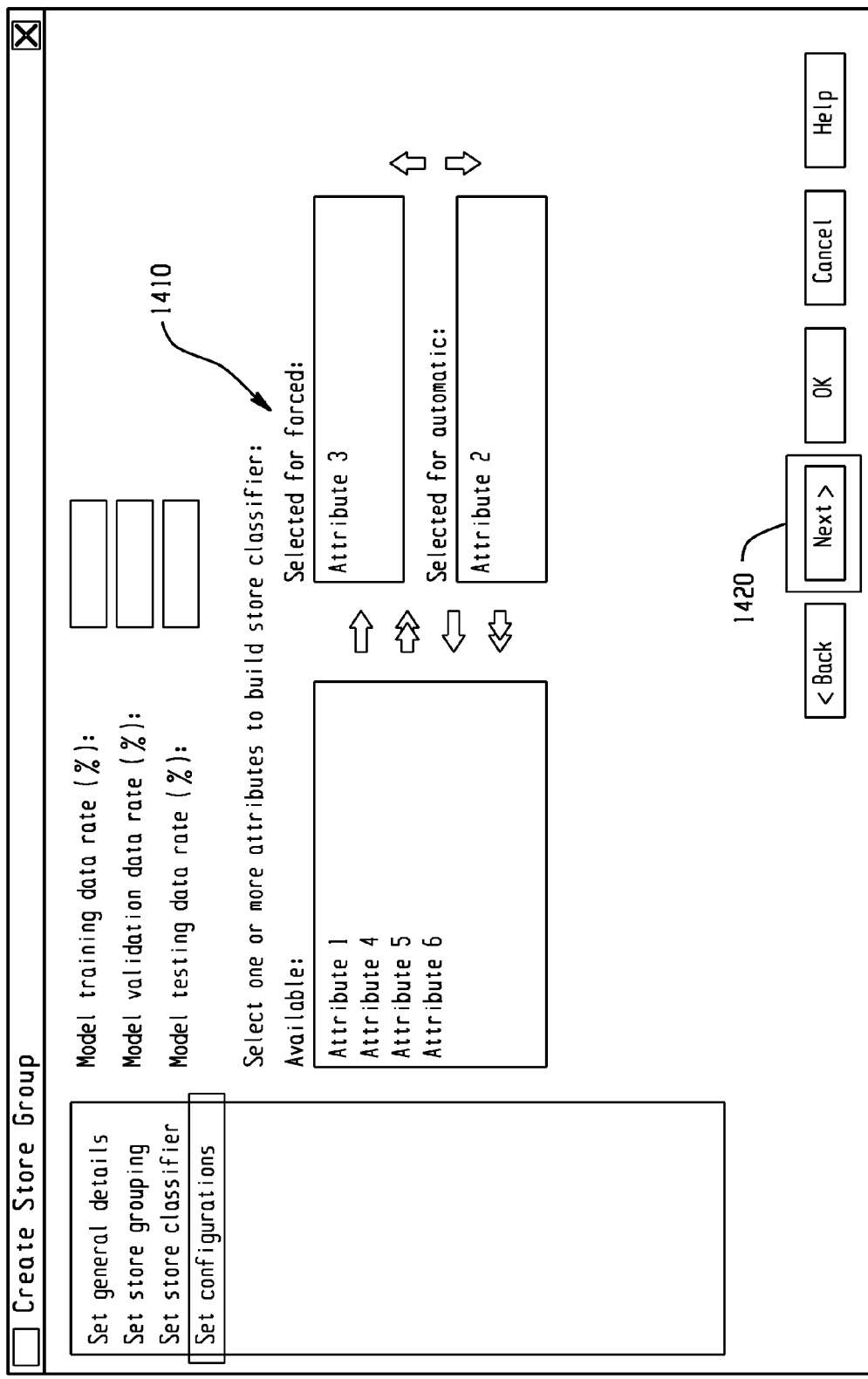
FIGS. 23-26B are graphical user interfaces illustrating user access for controlling data operations performed during a store classification process.

After changing the table views, the user can review and confirm the list of "store characteristics" that will be used by the system in the classification process. The system then constructs a store classification model based on user-specified store characteristics and configurations. Stores not participating in the store grouping process are classified into one of the resulting store groups based on the classification model. As shown in FIG. 22, store 9 (1100) and store 11 (1110) are to be classified. If a store is assigned to a like-store, the system classifies the store to the store group of the assigned like-store. In this case, store 9 (1100) is assigned to store group 1 (1130), and store 11 (1110) has been assigned to store group 2 (1140). The user can review store classification results, reset configuration settings for this phase, and re-classify until satisfied.

Classification assignments do not disturb a store group result. They extend the result to account for all stores known to the system. Moreover, a store grouping result that addresses all known stores is considered complete.

FIGS. 23-26 illustrate screens that a user can access for controlling the data operations performed during the store classification process. For example, screen 1400 allows at 1410 a user to select available attributes for use in the classification process. The user accesses interface item 1420 to set the configurations and to proceed to the next step in the store classification process.

Figure 24A:
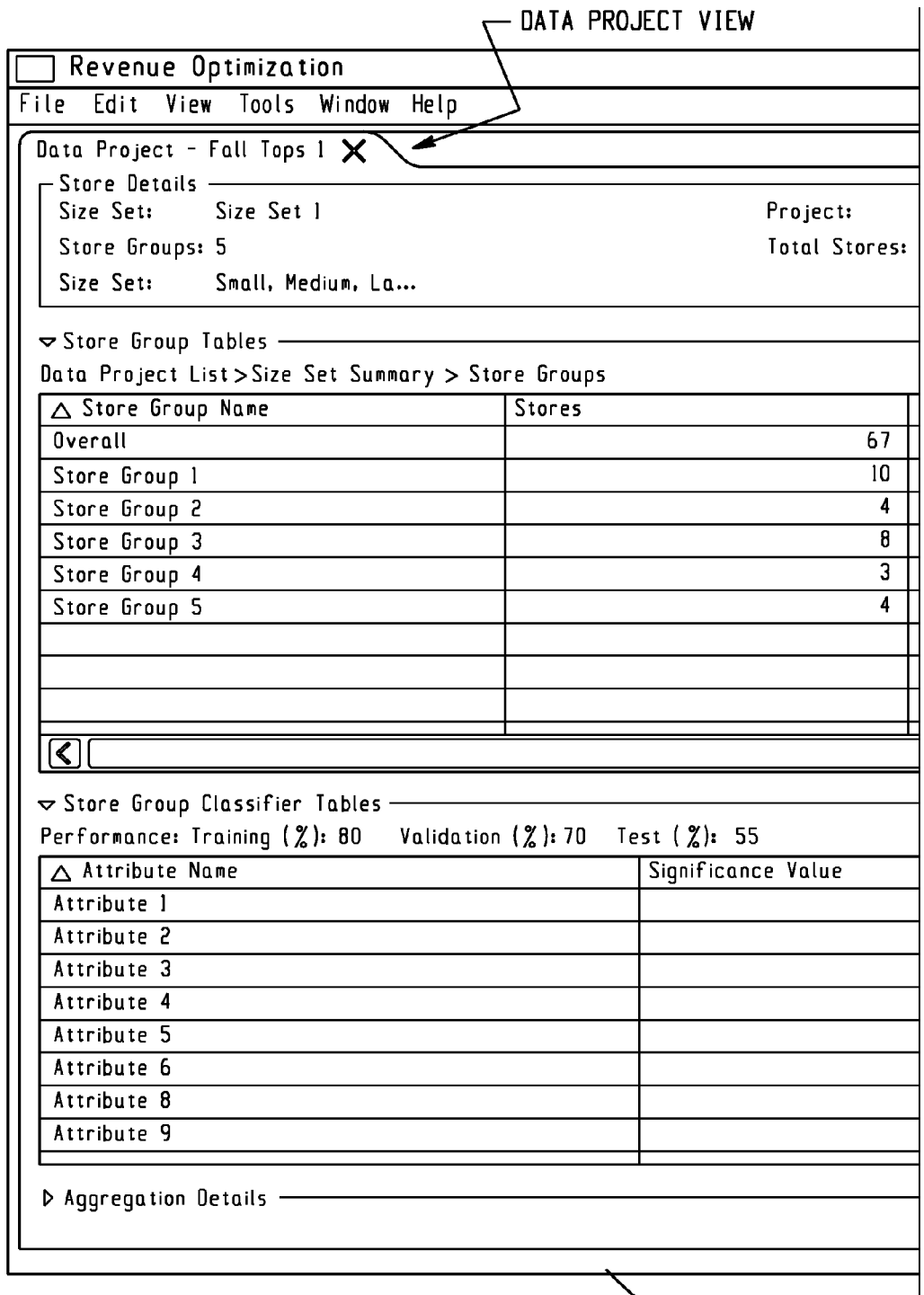
Figure 24B:
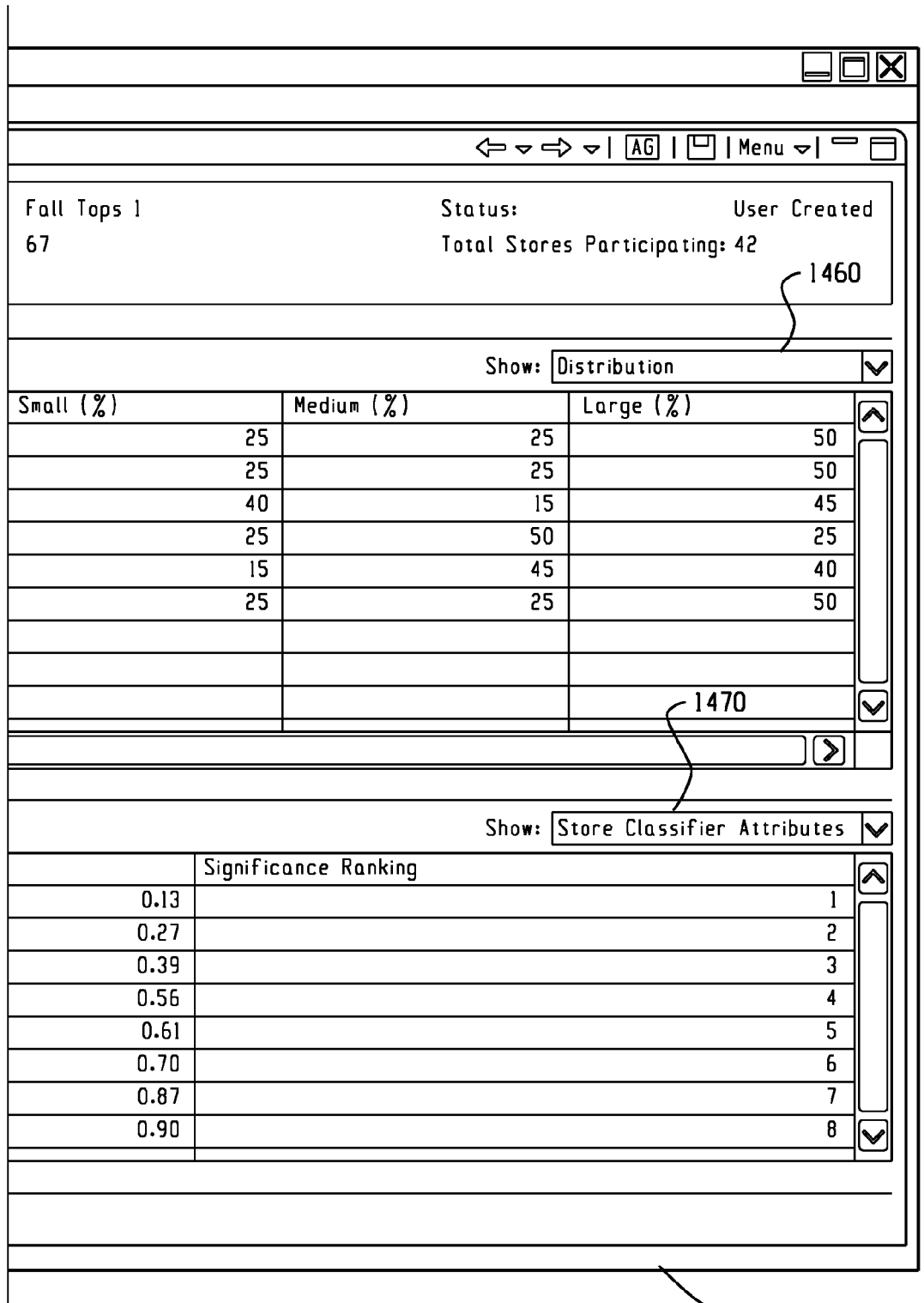
Figure 25A:
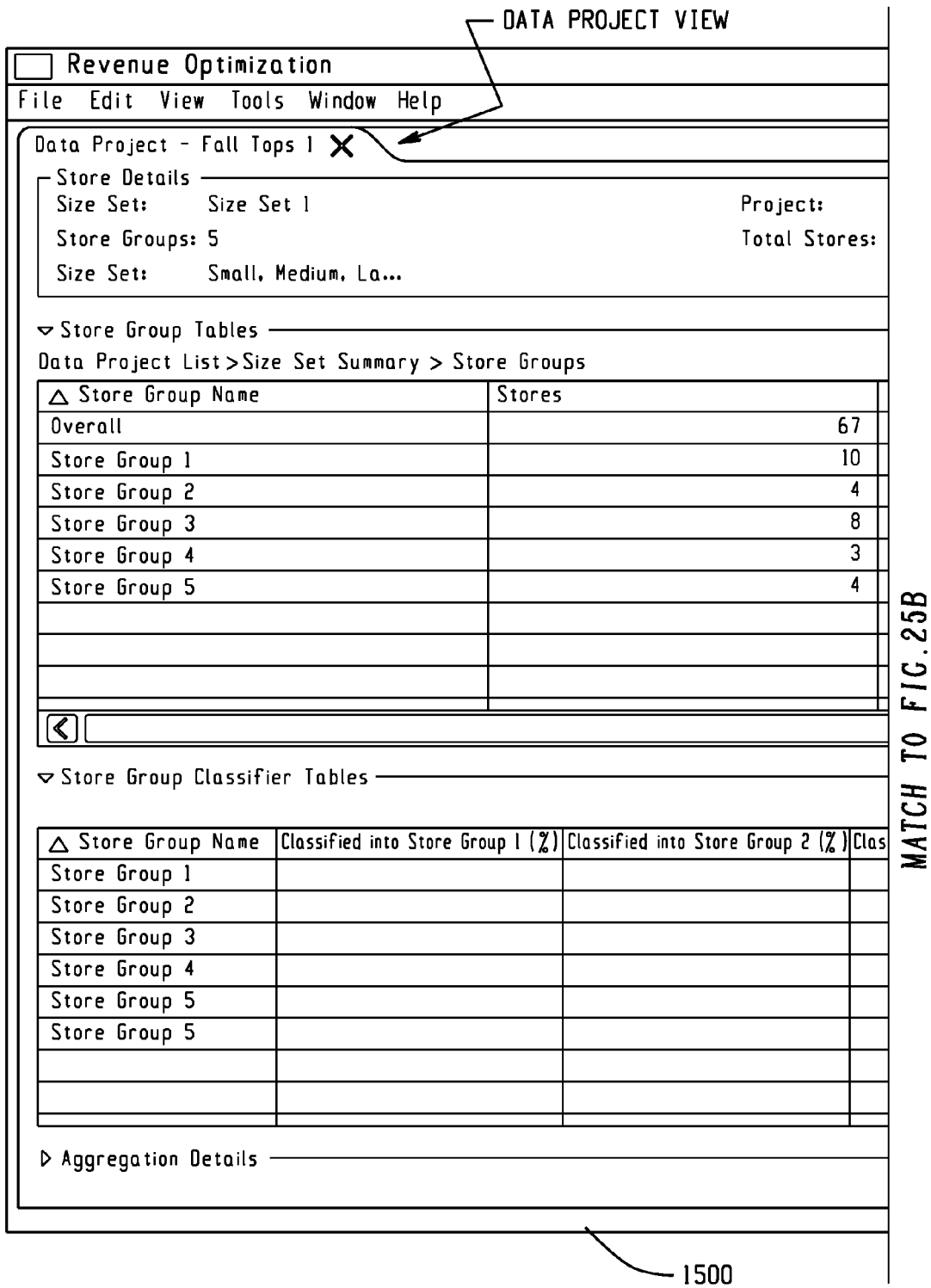
Figure 25B:
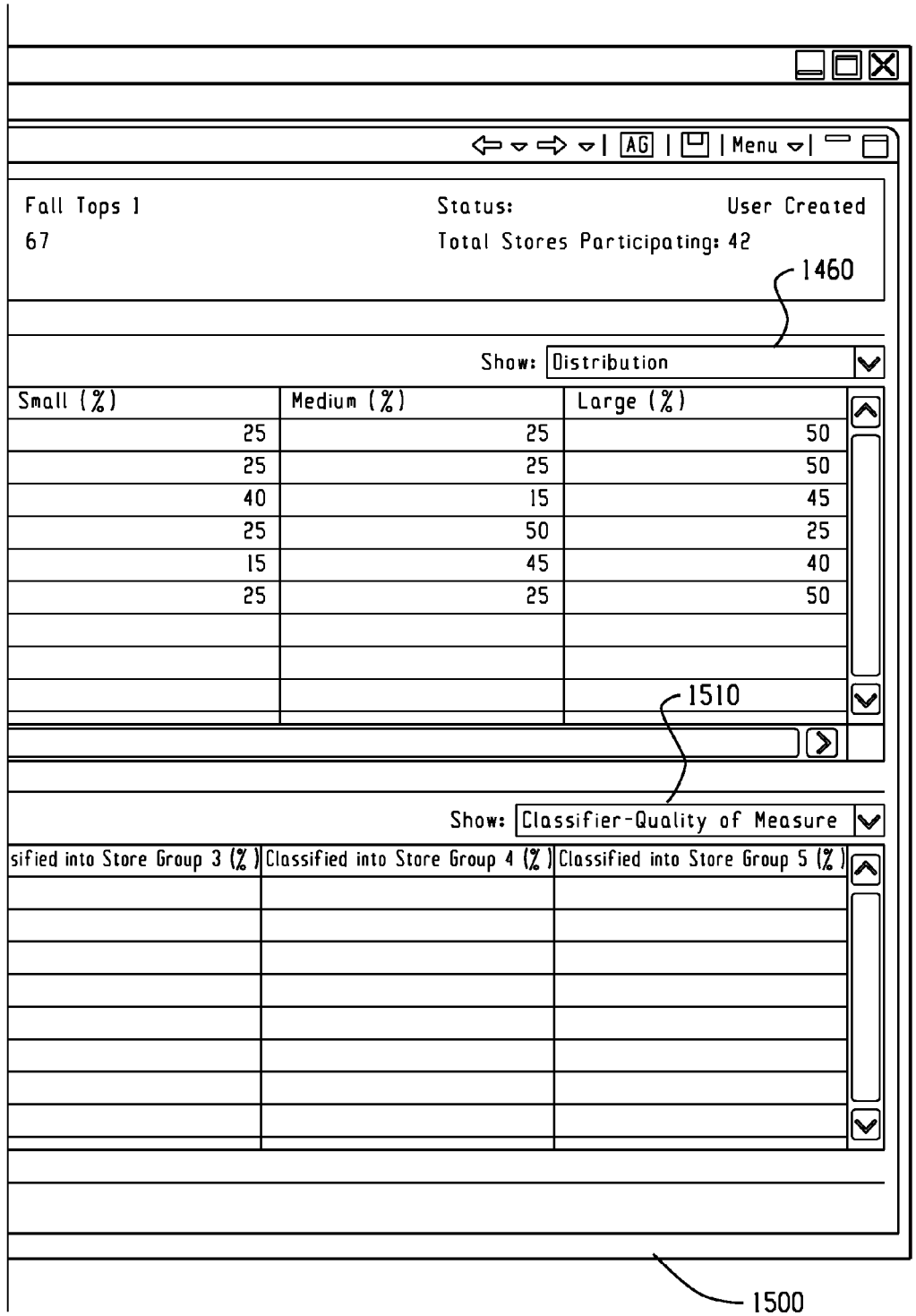
Figure 26A:
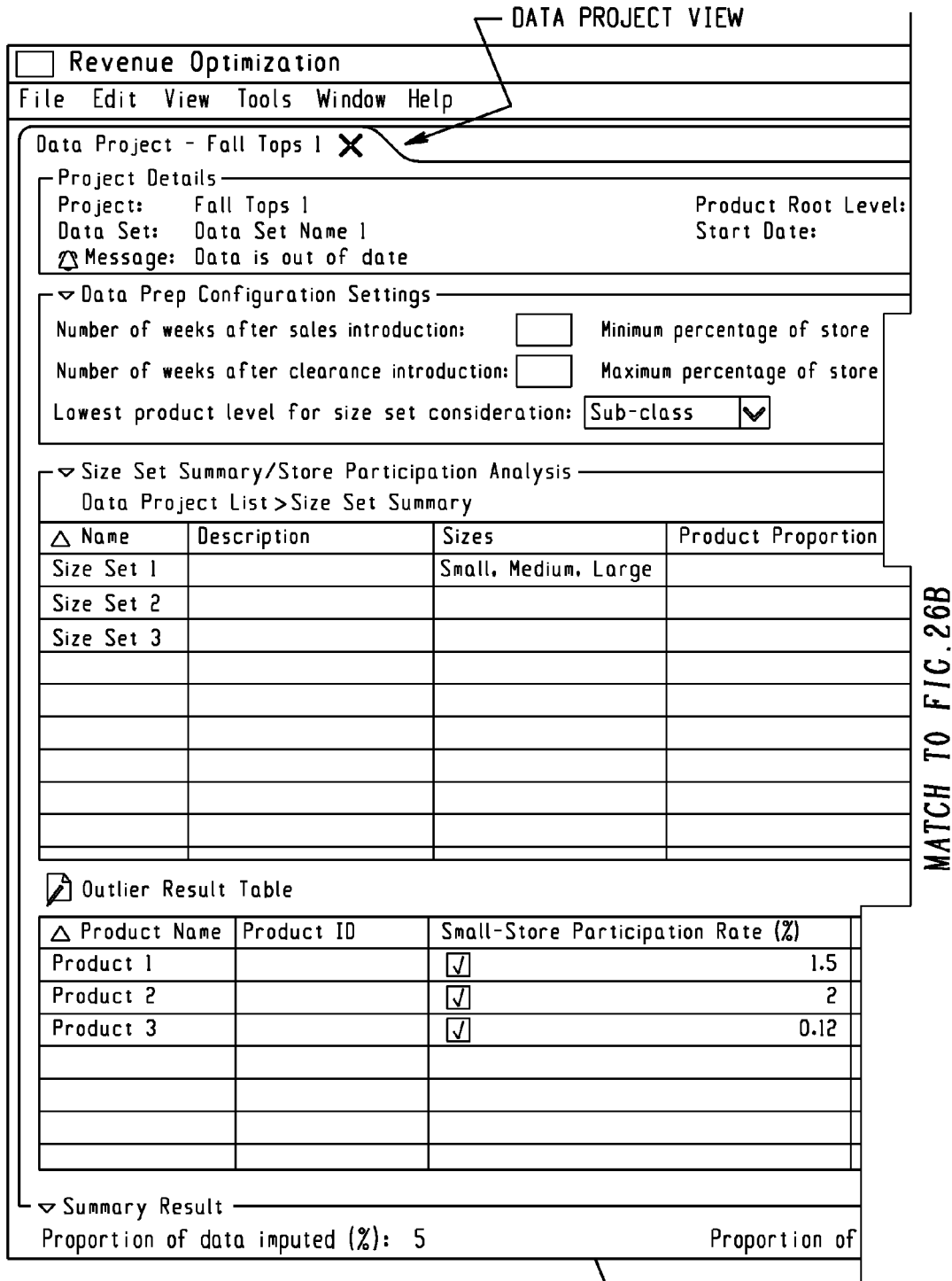

Screen 1450 on FIGS. 24A-24B allows a user to elect at 1460 to see distribution information for the different store groups. For example, store group 1 in this example has 10 stores, having a product breakdown of 25% small items, 25% medium items, and 50% large items. Screen 1450 also allows a user to choose at 1470 to see information about the store classifier attributes. For example, attribute 1 has a significance value of 0.13 and a significance ranking of 1. The user can also see other views about the data, such as the classifier quality of measure view which is shown at 1510 on screen 1500 of FIGS. 25A-25B, as well as drilling down to view more detailed information about the store groups that have been generated for the different size-sets as shown at 1560 on screen 1550 of FIGS. 26A-26B.

Once satisfied, the user confirms the store group result to be saved for the plan. The system persists the classification model information for future classification of new stores for this completed store group result.

The system prepares a profile datamart from the cleansed dataset that was used to generate the completed store group result. The profile datamart contains aggregated sales units across all stores that are assigned to the same group. Everything else remains unchanged.

To generate size profiles, the user creates a profile generation plan and selects a profile datamart containing a completed store group result from within the project. The user reviews the profile generation configuration settings and initiates profile generation for the plan. The system determines a size distribution for each store group at the top product node for the product scope. The system evaluates the size distributions generated on all nodes along the product hierarchy and determines the winning nodes based on a loss function. This constitutes a profile.

Figure 27:
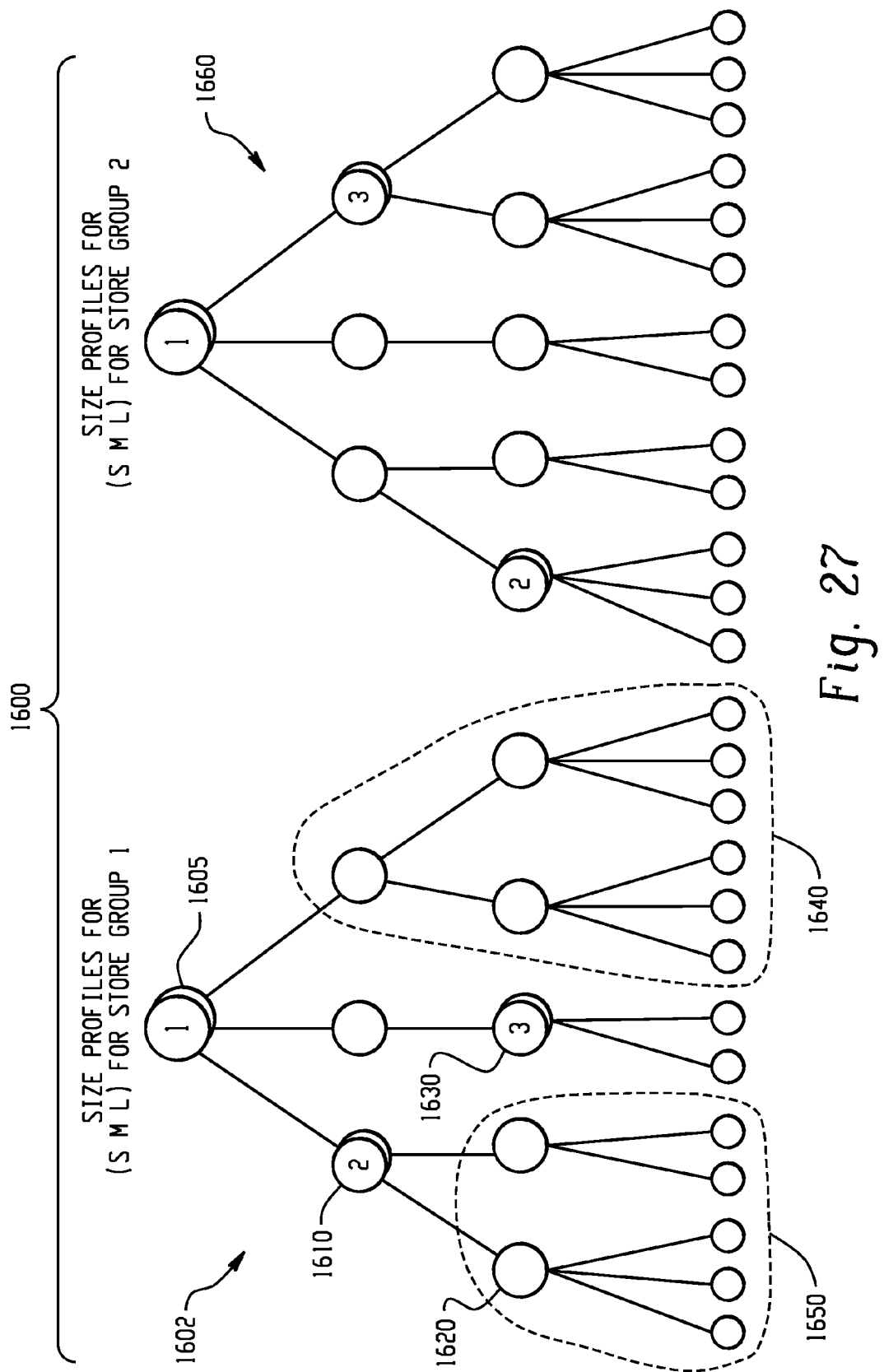
FIG. 27 depicts a product hierarchy for which size profiles have been generated.

FIG. 27 provides an illustration at 1600 of size profiles for {S, M, L} for the product hierarchy for store group 1 and store group 2. More specifically, the size profile for store group 1 is depicted at 1602, and the size profile for store group 2 is depicted at 1660.

With reference to the product hierarchy for store group 1, a SS #1 size distribution {S, M, L} is determined for Department-1. This produces a size distribution at each node in the product hierarchy profile for store group 1. To produce the size distribution, the system repeats the profile analysis for each child product node, considering only data from style-colors that are descendents of the selected node. The profile of each node is compared with its parent node (e.g., child node 1620 is compared with its parent node 1610), to determine if the profile is different enough to warrant being added to the list of profiles that addresses this product scope—that is, the system provides a differentiation for nodes that require a unique distribution that is significantly different from that of a parent node in the scope. This allows the best distribution to be assigned to each node based on the performance of its own distribution as compared to those of its ancestor nodes.

The system repeats this node comparison until all nodes to be assessed are analyzed (with node levels being controlled by configuration settings.) The tree 1600 illustrates that the system has determined that the three highlighted nodes "1," "2," and "3" (1605, 1610, and 1630) are the most robust. Children nodes inherit the details from the closest parent node that has been determined to be robust. For example, children product nodes 1640 inherit their details from the closest parent that has been determined to be robust which in this case is parent node "1" (1605). As another example, children product nodes 1650 inherit their details from the closest parent that has been determined to be robust which in this case is parent node "2" (1610). Accordingly, a profile result is created that consists of the list of profiles generated above, associated with a node in the product hierarchy. The user can review the profile result, reset configuration settings, re-generate profiles, until satisfied. Once satisfied, the results are used to provide item and size estimations for a store.

Figure 28B:
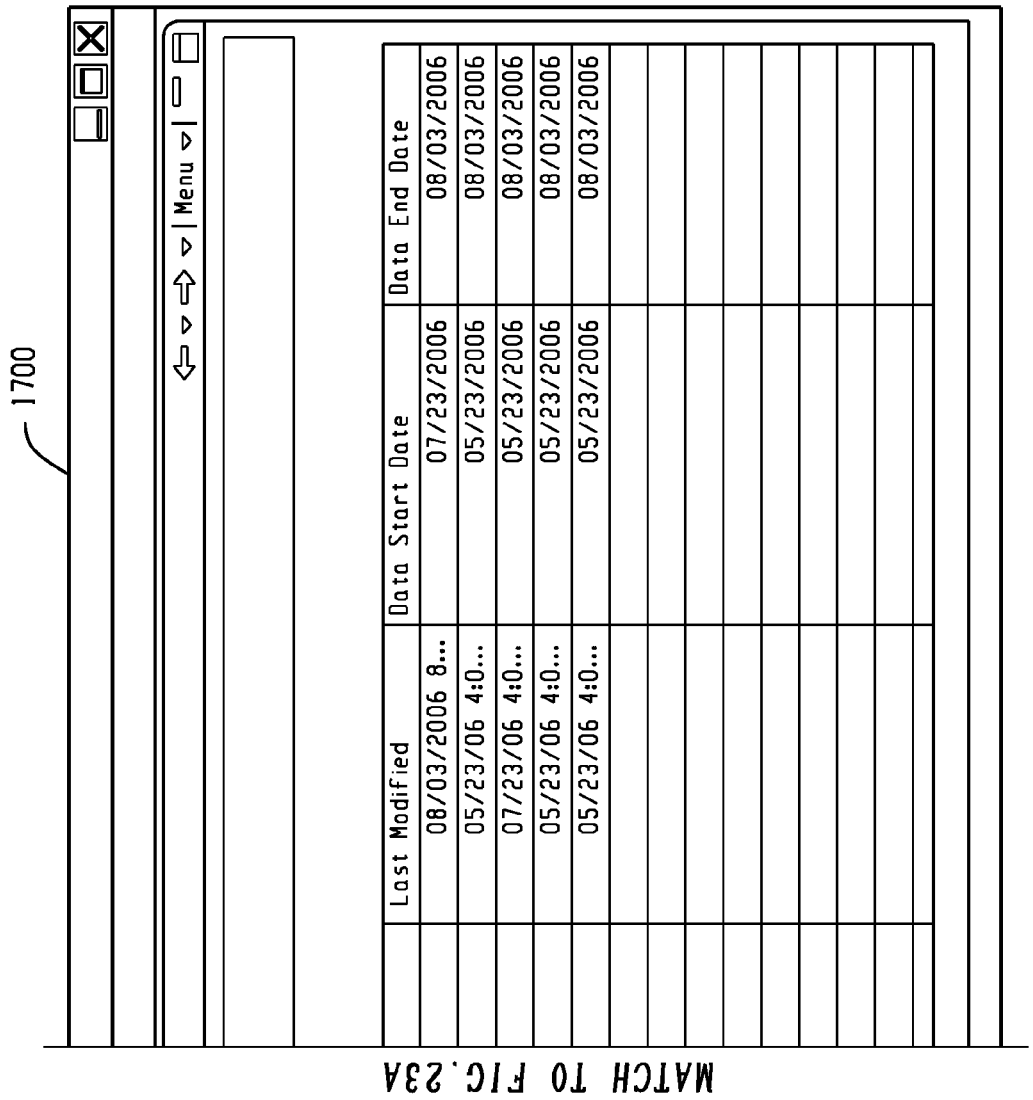
Figure 29A:
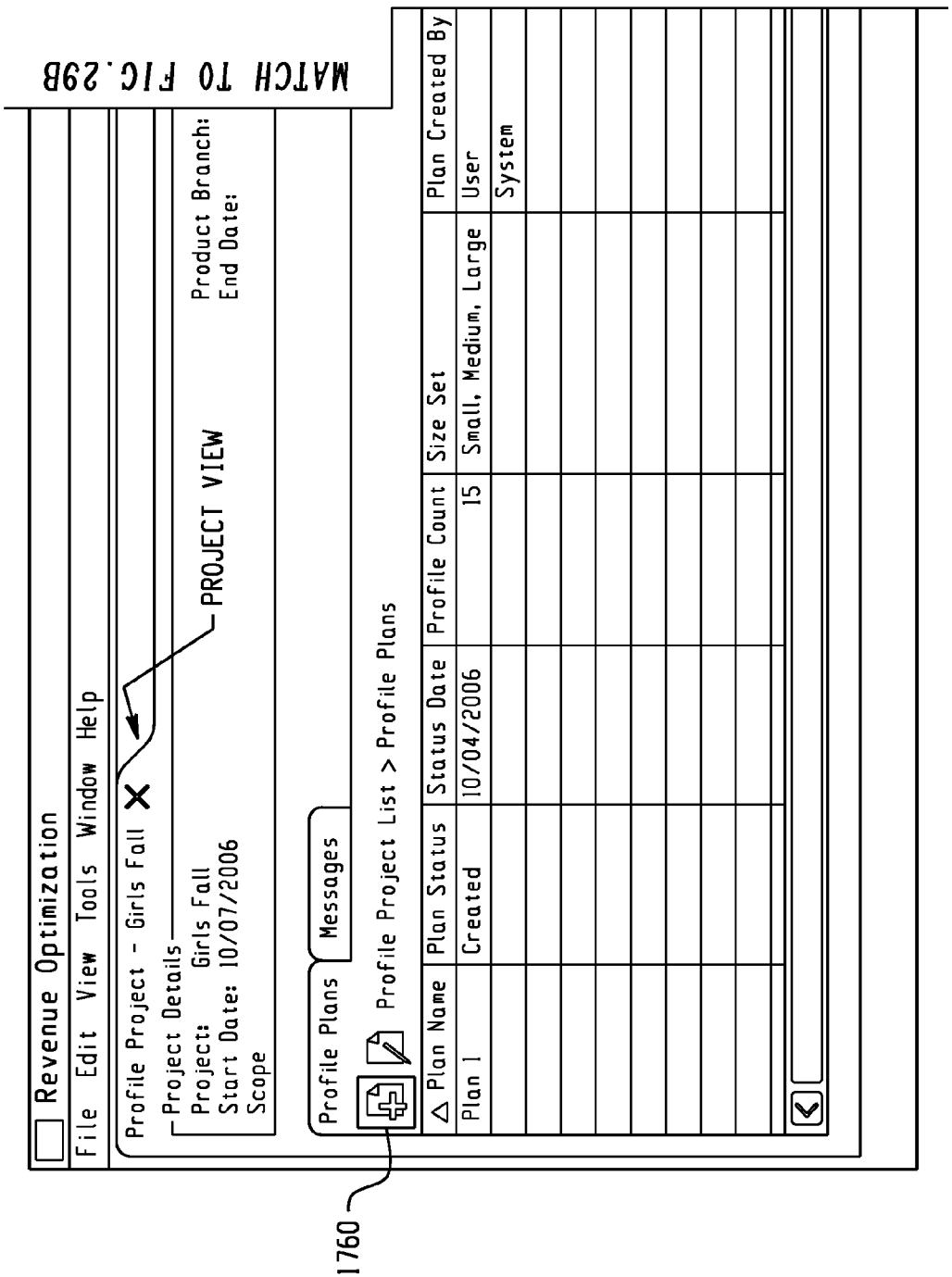
Figure 29B:
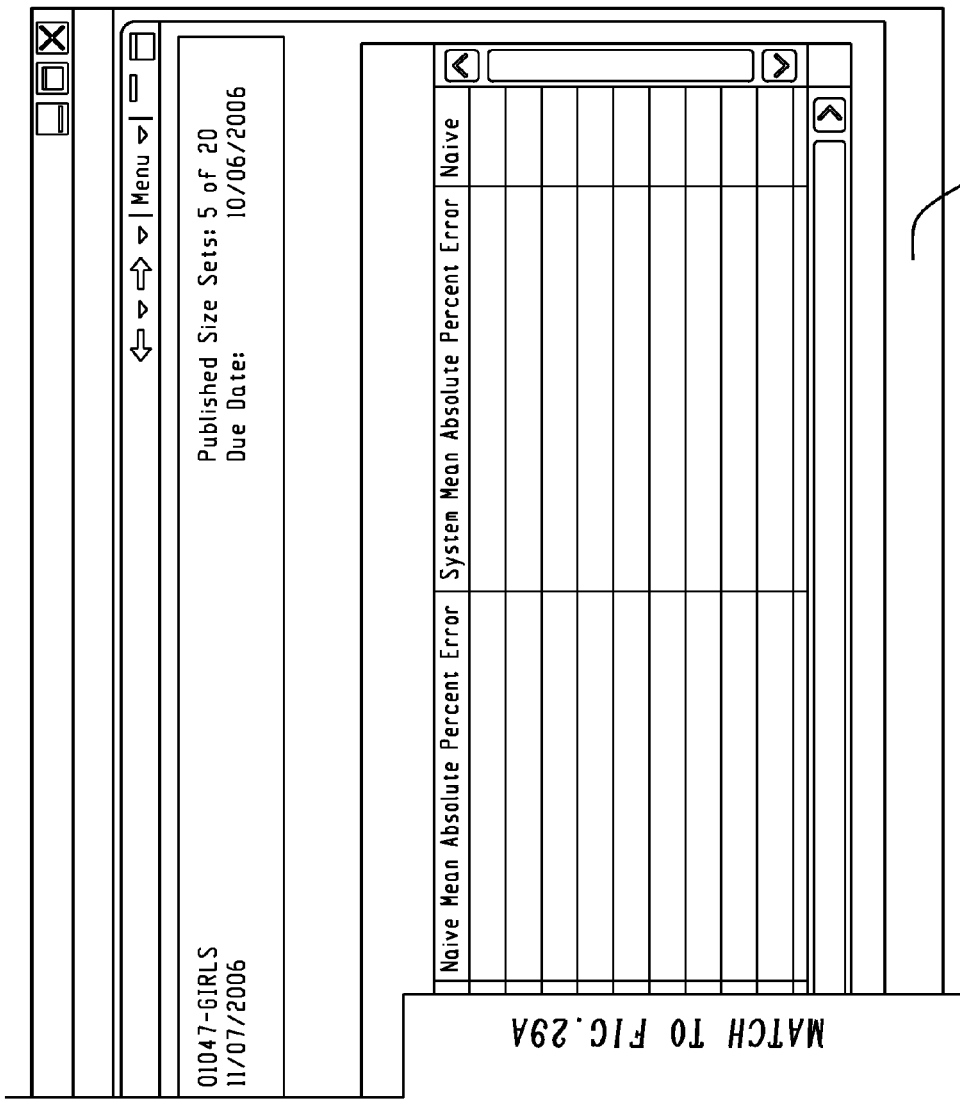
Figure 32:
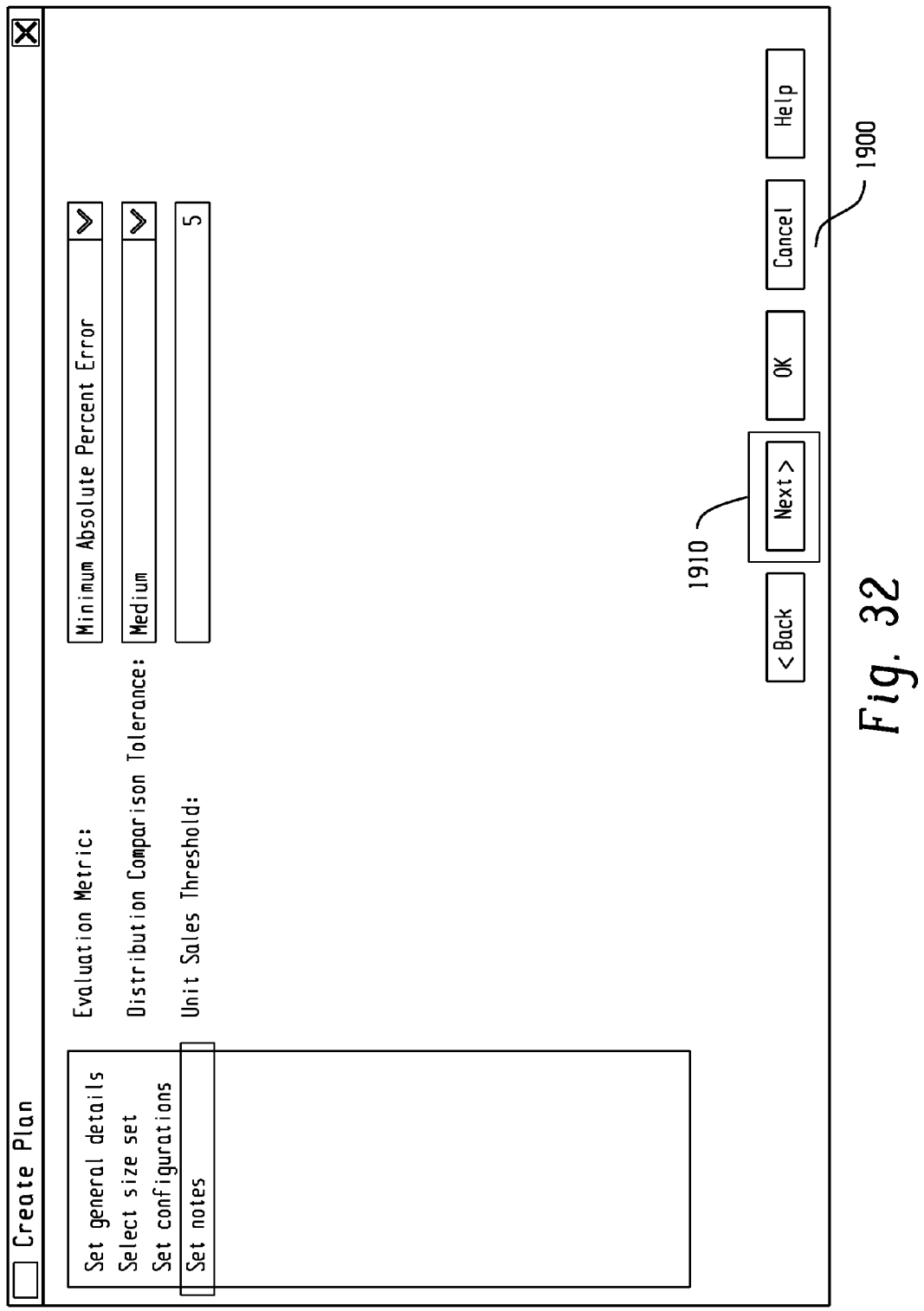
Figure 33A:
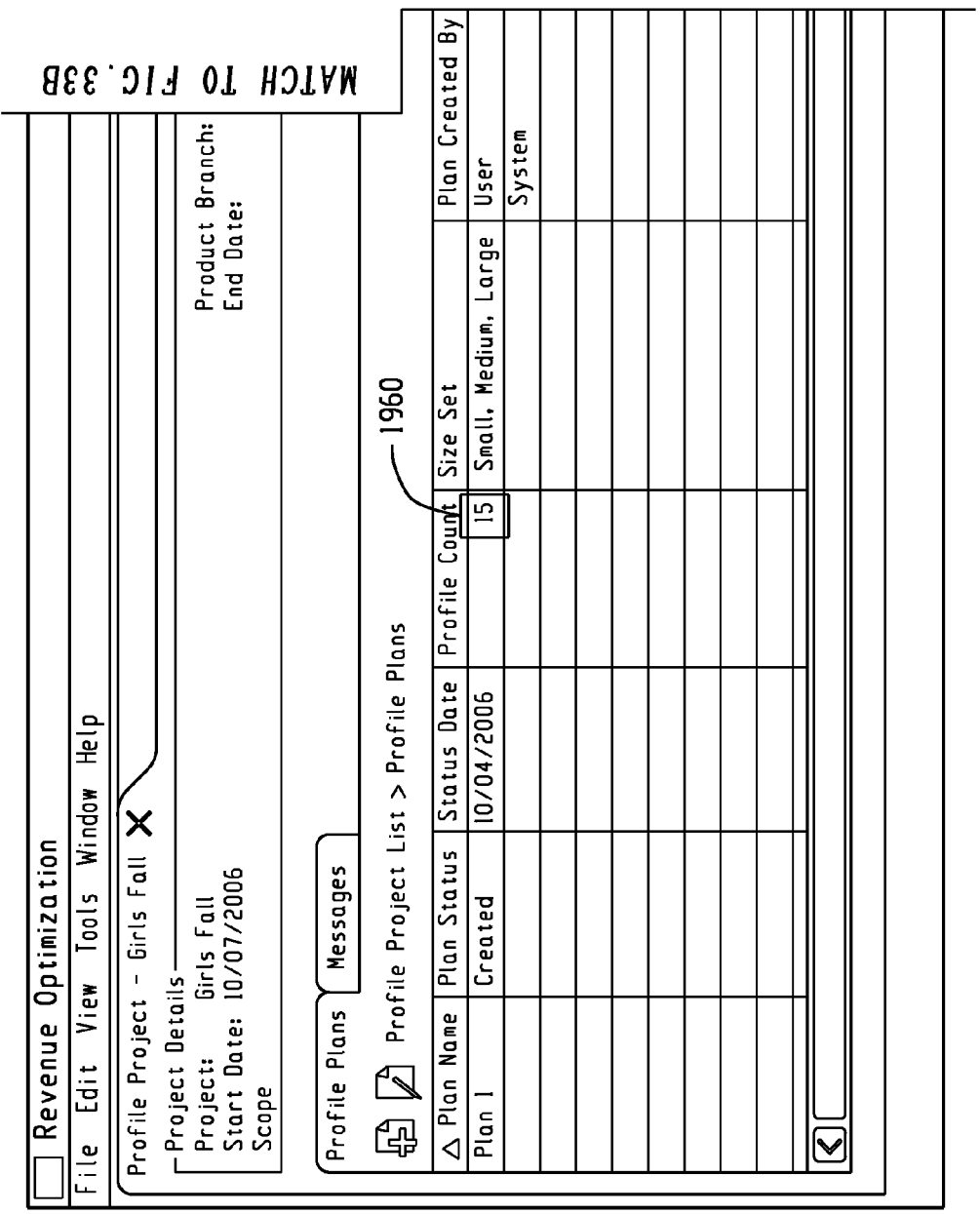
Figure 33B:
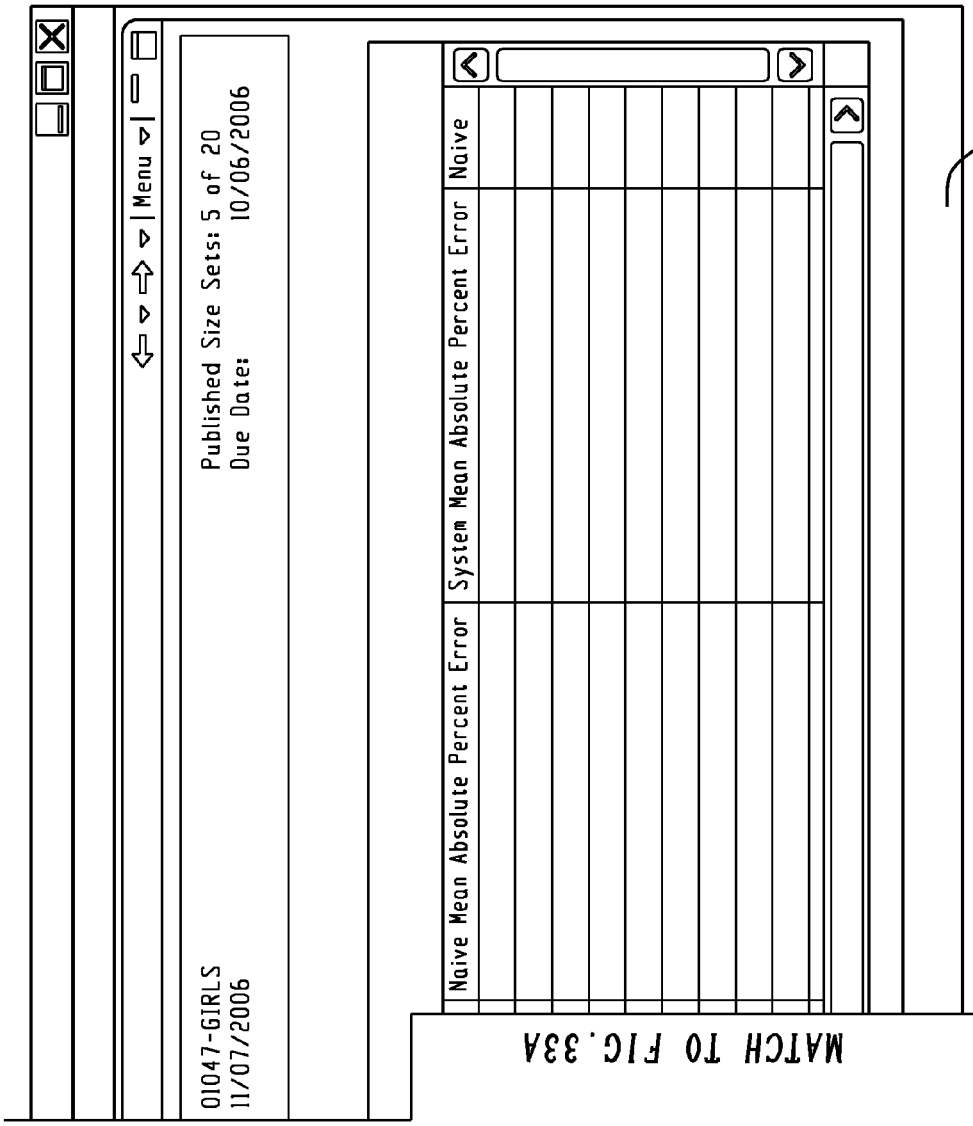
Figure 34A:
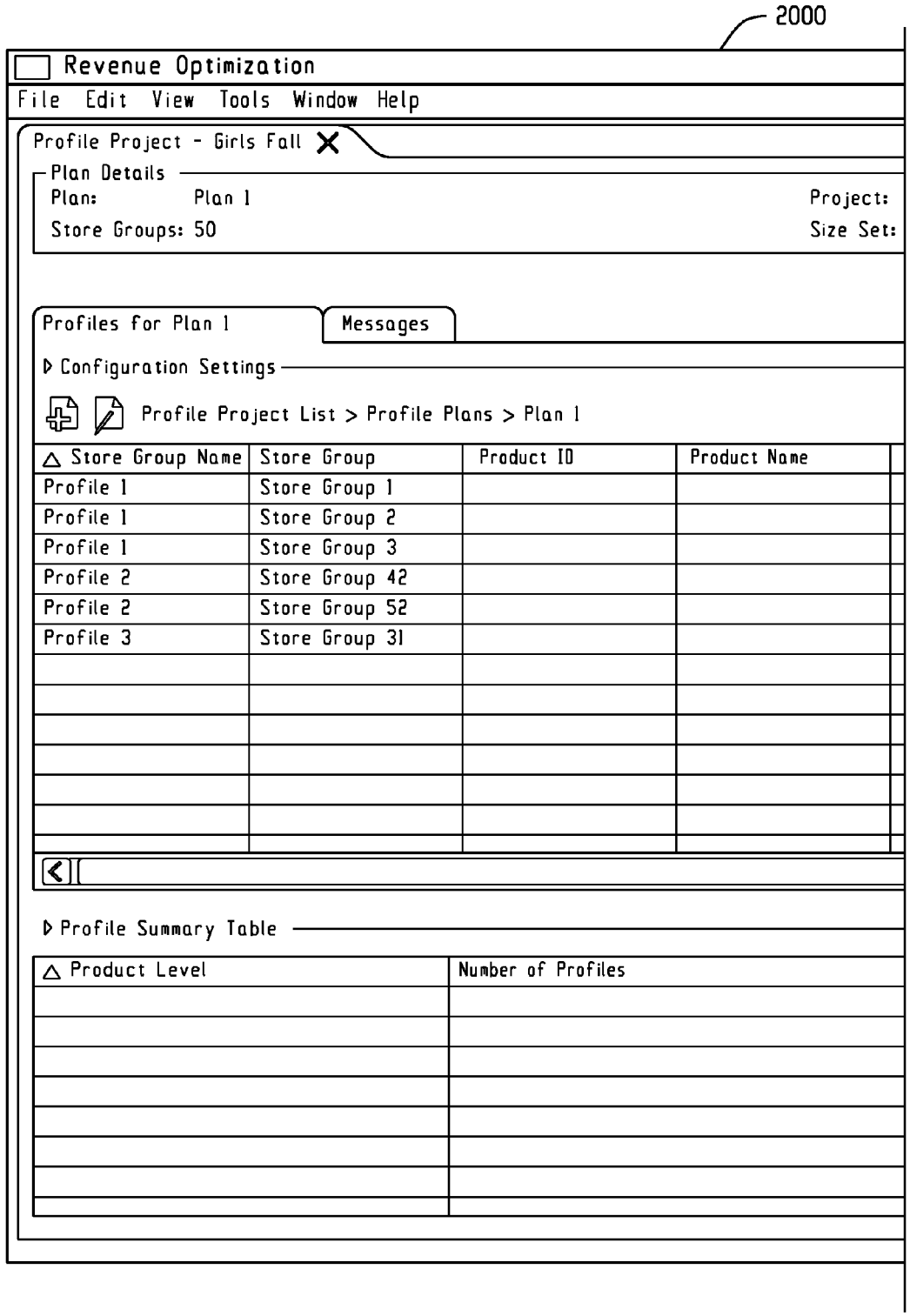
Figure 34B:
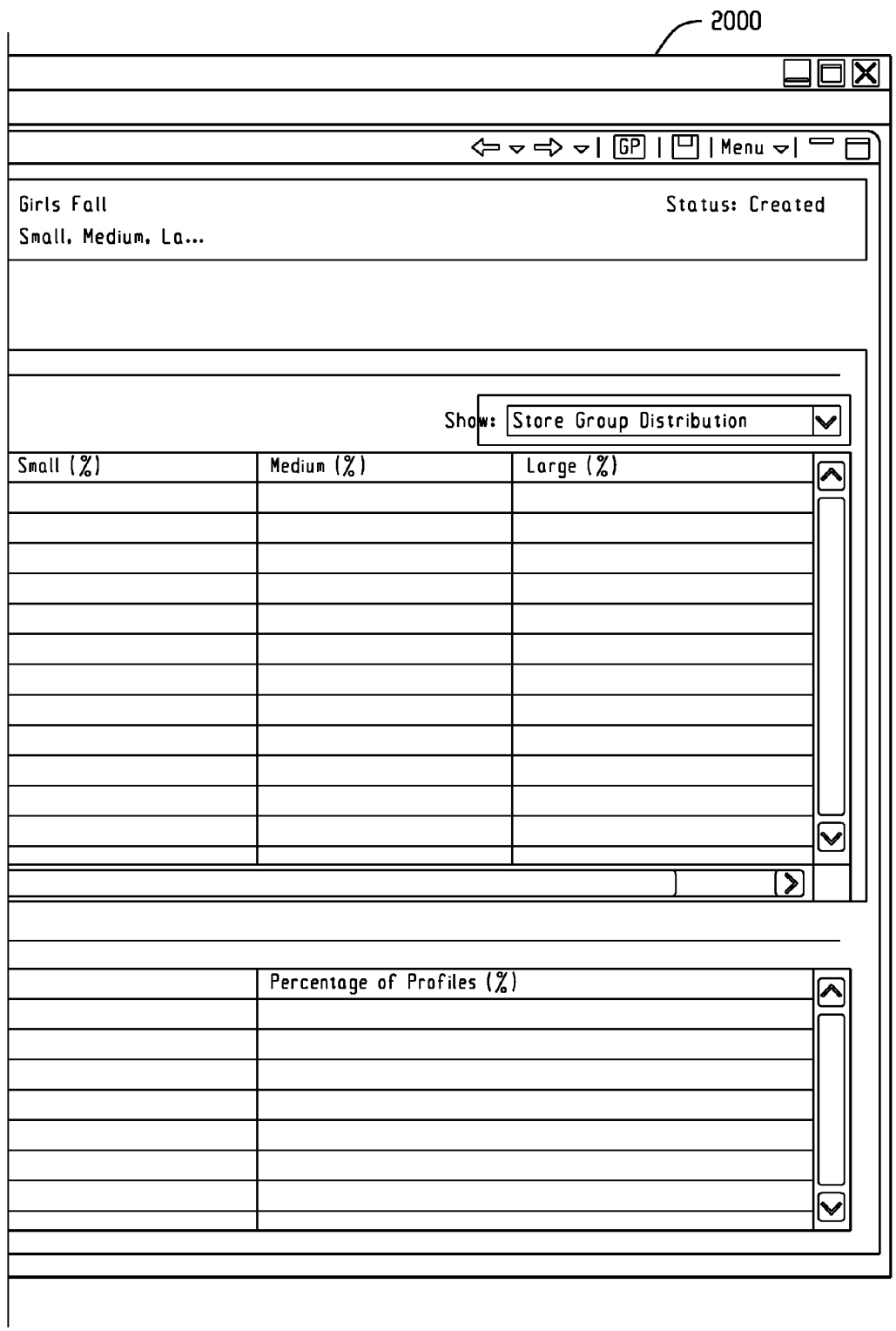
Figure 35A:
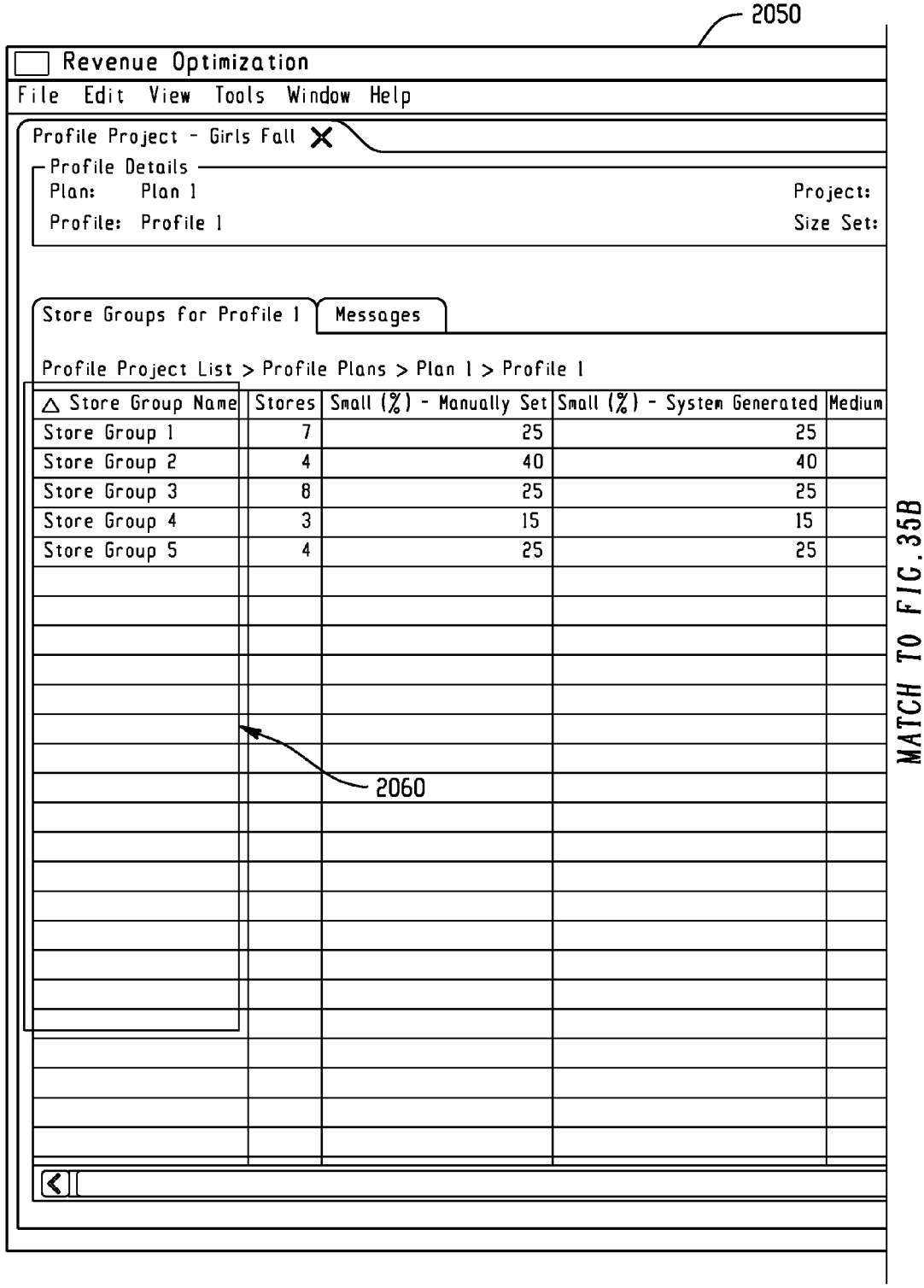
Figure 35B:
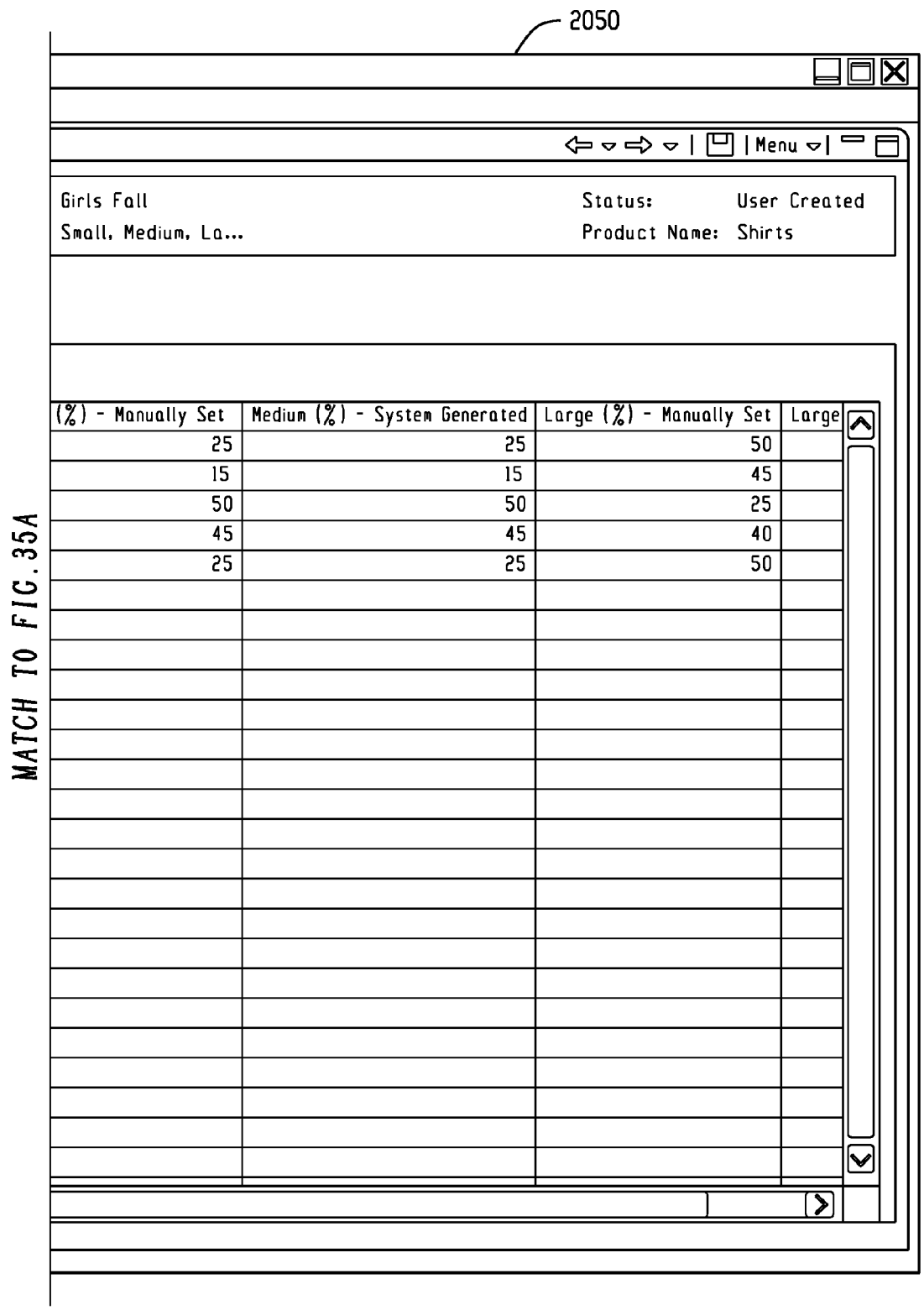

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration of the wide scope of the systems and methods described herein, FIGS. 28A-35B depict another example for the creation and handling of a new profile plan. With reference to FIGS. 28A-28B, a user clicks upon the interface item 1710 on screen 1700 in order to create a new data project. With reference to FIGS. 29A-29B, a user clicks upon the interface item 1760 on screen 1750 in order to create a new plan for this project. Screen 1800 on FIG. 30 allows the user to set general details about the plan, such as a name and a description. The user can click upon interface item 1810 in order to proceed to the next step of the process. Screen 1850 on FIG. 31 allows the user to select the size-set for the plan can be created. The user can click upon interface item 1860 in order to proceed to the next step of the process. Screen 1900 on FIG. 32 allows the user to set configuration details about the plan, such as the evaluation metric, distribution comparison tolerance, and unit sales threshold. The user can click upon interface item 1910 in order to proceed to the next step of the process. Screen 1950 on FIGS. 33A-33B allows the user to drill down to view all profiles for plan 1 as indicated at 1960. Screen 2000 on FIGS. 34A-34B allows the user to view configuration settings for the different store group profiles. Lastly screen 2050 on FIGS. 35A-35B allows the user to specifically view a list of store groups for profile 1.

Figure 36:
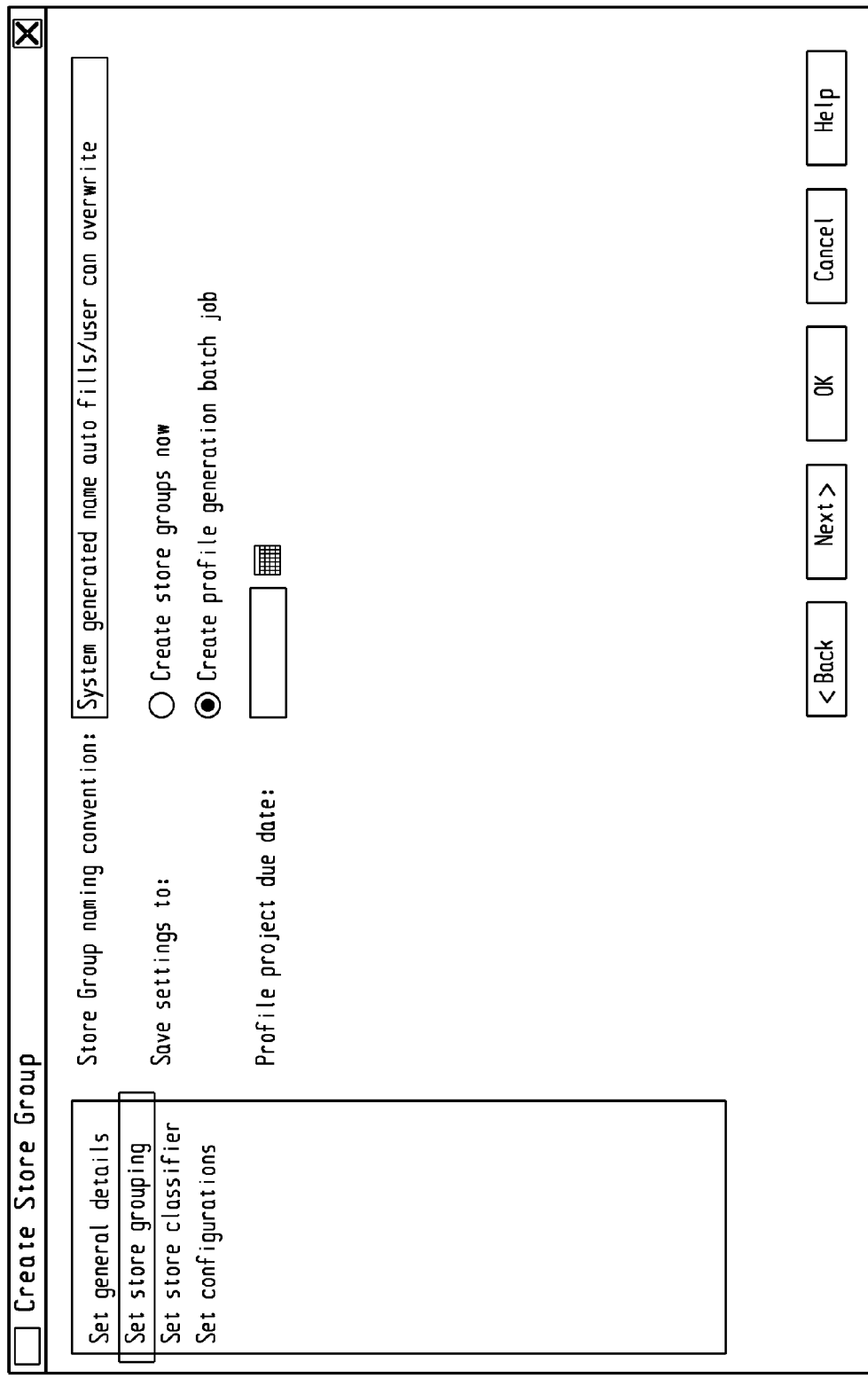
FIG. 36 is a graphical user interface for use with batch processing.

It should be understood that the operations and functions discussed herein may be automated such as through a batch process. As an illustration, screen 2100 on FIG. 36 allows a user to specify that the settings (that are defined through the various user interfaces) are to be used to create a profile generation batch job that is to run automatically.

Figure 37:
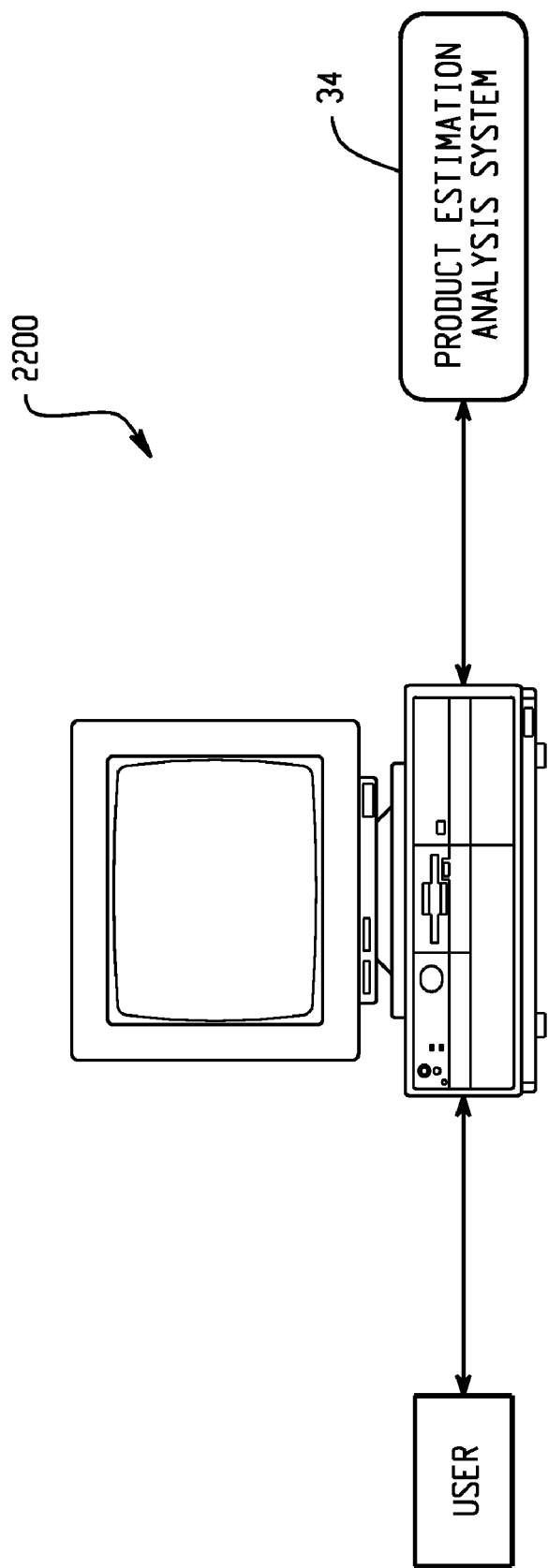
FIG. 37 is a block diagram depicting a product estimation analysis system being used with a stand-alone computer implementation.

As another illustration of the wide scope of the systems and methods disclosed herein, the systems and methods may be implemented on various types of computer architectures, such as for example on a single general purpose computer or workstation (as shown at 2200 on FIG. 37), or on a networked system, or in a client-server configuration, or in an application service provider configuration.

It is further noted that the systems and methods may include data signals conveyed via networks (e.g., local area network, wide area network, interne, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for estimating demand for a product at a plurality of stores, wherein the product is sold in several varieties, comprising:
receiving, using one or more data processors, a selection of a first attribute, wherein the first attribute is used to divide the plurality of stores into a plurality of groups;
generating, using the one or more data processors, a product hierarchy for each group, wherein the product hierarchy includes a plurality of levels containing a plurality of nodes arranged in parent-child relationships, wherein each parent node includes a total of each variety of the product sold at associated child nodes;
generating, using the one or more data processors, an aggregate distribution of demand at each parent node based upon the total of each variety of the product sold at the associated child nodes;
evaluating, using the one or more data processors, each node to identify robust nodes, wherein a robust node is identified when the aggregate distribution of a child node differs from the aggregate distribution of a parent node by more than a prespecified amount;
determining, using the one or more data processors, an aggregate distribution for each child node based on a parent node, wherein each child node inherits the aggregate distribution of a closest parent node that is a robust node; and
using the aggregate distributions at each child node to estimate demand for each variety of the product using the one or more data processors, wherein demand at each child node is estimated based upon the aggregate distribution of a nearest robust parent node at a higher level of the product hierarchy.

2. The method of claim 1, further comprising:
receiving configuration data used to remove one or more stores from the plurality of stores that are divided into the plurality of groups.

3. The method of claim 2, wherein the configuration data includes store characteristic data specifying a characteristic to use to remove one or more stores from the plurality of stores.

4. The method of claim 3, wherein the characteristic is selected from the group consisting of: a store being a non-comparable store, a store being a new store, and a store having a low volume of historical data.

5. The method of claim 1, further comprising:
receiving, using the one or more data processors, store attribute data for a new store, wherein the new store is not in one of the plurality of groups; and
assigning, using the one or more data processors, the new store to one of the groups based upon the store attribute data.

6. The method of claim 1, wherein each store has corresponding store sales data, wherein the store sales data is adjusted for a particular store for periods when demand was constrained, and wherein the adjusted store sales data is the first attribute used to divide the plurality of stores.

7. The method of claim 6, wherein the store sales data is point-of-sale data.

8. The method of claim 6, further comprising:
imputing, using the one or more data processors, additional sales data to the particular store for periods when demand was constrained, wherein the additional sales data includes supplemental sales data from a different store having a similar sales pattern.

9. The method of claim 8, wherein the constrained demand includes an out-of-stock condition.

10. The method of claim 1, wherein each store has corresponding store demand data, wherein the store demand data is cleansed, and wherein the cleansed store demand data is the first attribute used to divide the plurality of stores.

11. The method of claim 10, wherein the data cleansing includes cleansing the store demand data by comparing sales and inventory figures, and wherein the comparison is used to determine whether the store demand data should be adjusted.

12. The method of claim 1, wherein multiple child nodes of a particular parent node inherit a particular non-zero aggregate distribution from the particular parent.

13. The method of claim 1, wherein an aggregate distribution represents portions of total sales for the product that are represented by variations of the product.

14. The method of claim 1, wherein the product is a clothing product, wherein the aggregate distribution identifies sales of small, medium, and large variations of the clothing product.

15. The method of claim 1, wherein demand is estimated for each variety of the product by generating a forecast at each child node based on the aggregate distributions at each child node.

16. A computer-implemented system for estimating demand of a product at a plurality of stores, wherein the product is sold in several varieties, the system comprising:
one or more processors;
a computer-readable storage medium containing instructions to cause the one or more processors to perform operations, including:
receiving a selection of a first attribute, wherein the first attribute is used to divide the plurality of stores into a plurality of groups;
generating a product hierarchy for each group, wherein the product hierarchy includes a plurality of levels containing a plurality of nodes arranged in parent-child relationships, wherein each parent node includes a total of each variety of the product sold at associated child nodes;
generating an aggregate distribution of demand at each parent node based upon the total of each variety of the product sold at the associated child nodes;
evaluating each node to identify robust nodes, wherein a robust node is identified when the aggregate distribution of a child node differs from the aggregate distribution of a parent node by more than a prespecified amount;
determining an aggregate distribution for each child node based on a parent node, wherein each child node inherits the aggregate distribution of a closest parent node that is a robust node; and
using the aggregate distributions at each child node to estimate demand for each variety of the product, wherein demand at each child node is estimated based upon the aggregate distribution of a nearest robust node at a higher level of the product hierarchy.

17. A computer program product for estimating demand for a product at a plurality of stores, wherein the product is sold in several varieties, tangibly embodied in a machine-readable storage medium, including instructions configured to cause a data processing system to:
receive a selection of a first attribute, wherein the first attribute is used to divide the plurality of stores into a plurality of groups;

generate a product hierarchy for each group, wherein the product hierarchy includes a plurality of levels containing a plurality of nodes arranged in parent-child relationships, wherein each parent node includes a total of each variety of the product sold at associated child nodes;

generate an aggregate distribution of demand at each parent node based upon the total of each variety of the product sold at the associated child nodes;

evaluate each node to identify robust nodes, wherein a robust node is identified when the aggregate distribution of a child node differs from the aggregate distribution of a parent node by more than a prespecified amount;

determine an aggregate distribution for each child node based on a parent node, wherein each child node inherits the aggregate distribution of a closest parent node that is a robust node; and use the aggregate distributions at each child node to estimate demand for each variety of the product, wherein demand at each child node is estimated based upon the aggregate distribution of a nearest robust parent node at a higher level of the product hierarchy.

* * * * *